US010299244B2

(12) United States Patent
Griot et al.

(10) Patent No.: US 10,299,244 B2
(45) Date of Patent: May 21, 2019

(54) SMALL DATA TRANSMISSION IN A WIRELESS COMMUNICATIONS SYSTEM

(71) Applicant: QUALCOMM Incorporated, San Diego, CA (US)

(72) Inventors: Miguel Griot, La Jolla, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 15/172,110

(22) Filed: Jun. 2, 2016

(65) Prior Publication Data
US 2016/0374048 A1 Dec. 22, 2016

Related U.S. Application Data

(60) Provisional application No. 62/182,403, filed on Jun. 19, 2015.

(51) Int. Cl.
H04W 4/70 (2018.01)
H04W 68/00 (2009.01)
(Continued)

(52) U.S. Cl.
CPC .......... *H04W 68/005* (2013.01); *H04W 4/70* (2018.02); *H04L 63/123* (2013.01); *H04W 12/10* (2013.01)

(58) Field of Classification Search
CPC . H04W 4/005; H04W 12/10; H04W 74/0833; H04W 68/005; H04L 63/123
See application file for complete search history.

(56) References Cited

U.S. PATENT DOCUMENTS

2011/0032889 A1* 2/2011 Lee ................... H04W 74/006
370/329
2012/0282956 A1* 11/2012 Kim ...................... H04L 51/38
455/466

(Continued)

FOREIGN PATENT DOCUMENTS

CN 102333293 * 1/2012
WO WO-2014019235 A1 2/2014

OTHER PUBLICATIONS

ISA/EP, International Search Report and Written Opinion of the International Searching Authority, Int'l App. No. PCT/US2016/035760, dated Aug. 11, 2016, European Patent Office, Rijswijk, NL, 12 pgs.

*Primary Examiner* — Un C Cho
*Assistant Examiner* — Lalita W Pace
(74) *Attorney, Agent, or Firm* — Holland & Hart LLP

(57) ABSTRACT

Techniques are provided for transmission of small data packets through a paging procedure in a MTC or cellular internet of things system (CIoT). A core network may receive data to be transmitted to a user equipment (UE) and may determine that a small data packet transmission may be initiated for the data. The core network may format the small data packet into a paging request that includes the data and a UE identification, and transmit the paging request to a base station. The base station may receive the paging request, and initiate a page process with the UE. The UE may receive a page message, and initiate an access procedure that may be used for transmission of the small data. The UE may be in idle mode prior to the small data transmission, and in some examples may return to idle mode following the transmission of the small data.

20 Claims, 14 Drawing Sheets

(51) Int. Cl.
*H04W 12/10* (2009.01)
*H04L 29/06* (2006.01)

(56) References Cited

U.S. PATENT DOCUMENTS

| | | |
|---|---|---|
| 2013/0077484 A1 | 3/2013 | Zhao et al. |
| 2013/0100895 A1* | 4/2013 | Aghili .................... H04W 4/00 370/329 |
| 2013/0301611 A1* | 11/2013 | Baghel ................. H04W 76/12 370/331 |
| 2014/0036795 A1* | 2/2014 | Martinez Tarradell ..................... H04W 4/70 370/329 |
| 2014/0126489 A1* | 5/2014 | Zakrzewski .......... H04W 28/26 370/329 |
| 2015/0085689 A1* | 3/2015 | Vos ................... H04W 74/0833 370/252 |
| 2015/0304799 A1* | 10/2015 | Park ....................... H04W 4/70 370/329 |
| 2016/0212728 A1* | 7/2016 | Chang ................ H04W 68/025 |
| 2017/0111929 A1* | 4/2017 | Ronneke ............ H04W 74/002 |

\* cited by examiner

SMALL DATA TRANSMISSION IN A WIRELESS COMMUNICATIONS SYSTEM

CROSS REFERENCES

The present Application for Patent claims priority to U.S. Provisional Patent Application No. 62/182,403 by Griot et al., entitled "Small Data Transmission In A Wireless Communications System," filed Jun. 19, 2015, assigned to the assignee hereof.

BACKGROUND

Field of Disclosure

The following relates generally to wireless communication, and more specifically to transmission of small data packets in a machine-type-communication (MTC) or cellular internet of things (CIoT) system.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of a cellular internet of things (CIoT) network. CIoT may refer to low data rate communication with M2M or MTC devices using LTE/LTE-A networks. Some M2M or MTC devices in a CIoT may include parking meters, water and gas meters, and other sensors that may relatively infrequently communicate small amounts of data.

In some cases, including in a CIoT, a UE may be a power limited device, and a significant amount of power may be used for powering radio components. However, some MTC devices may transmit or receive relatively small amounts of data on a relatively infrequent basis. In such cases, the overhead associated with establishing a radio resource control (RRC) connection may consume a significant amount of resources relative to the resources needed to transmit the small amounts of data. The increased power consumption from repeatedly establishing an RRC connection for communication of small amounts of data may reduce the battery life of a UE and decrease the usefulness of the device. Furthermore, the network resources used for overhead in establishing RRC connections for transmissions of small amounts of data may reduce the efficiency of a wireless communications system.

SUMMARY

The present disclosure relates to improved systems, methods, and/or apparatuses for transmission of small data packets through a paging procedure in a Machine Type Communication (MTC) or cellular internet of things (CIoT) system. In some examples, a core network may receive data to be transmitted to a user equipment (UE), such as an MTC device, and may determine that a small data packet transmission may be initiated for the data. The core network may format the small data packet into a paging request that includes the data, and transmit the paging request to a base station. The base station may receive the paging request, and initiate a page process with the UE. The base station may, in some examples, transmit a page message to the UE that indicates a small data transmission is to be sent. The UE may receive the page message, and initiate an access procedure that may be used for transmission of the small data. The UE may, for example, transmit a random access request to the base station responsive to the page message, and the base station may transmit the data to the UE as part of a random access response message to the UE. The UE may be in idle mode prior to the small data transmission, and in some examples may return to idle mode following the transmission of the small data packet.

A method of wireless communication is described. The method may include receiving a small data packet to be transmitted to a UE, formatting the small data packet into a paging request, the paging request including UE identification information and the small data packet, and transmitting the paging request to one or more base stations.

An apparatus for wireless communication is described. The apparatus may include means for receiving a small data packet to be transmitted to a UE, means for formatting the small data packet into a paging request, the paging request including UE identification information and the small data packet, and means for transmitting the paging request to one or more base stations.

A further apparatus for wireless communication is described. The apparatus may include a processor, memory in electronic communication with the processor, and instructions stored in the memory, wherein the instructions are executable by the processor to receive a small data packet to be transmitted to a UE, format the small data packet into a paging request, the paging request including UE identification information and the small data packet, and transmit the paging request to one or more base stations.

A non-transitory computer-readable medium storing code for wireless communication is described. The code may include instructions executable to receive a small data packet to be transmitted to a UE, format the small data packet into a paging request, the paging request including UE identification information and the small data packet, and transmit the paging request to one or more base stations.

Some examples of the method, apparatuses, or non-transitory computer-readable medium described above may further include determining whether a confirmation of delivery of the small data packet is received, and retransmitting the paging request to the one or more base stations in an absence of the confirmation within a defined period of time.

Some examples of the method, apparatuses, or non-transitory computer-readable medium described formatting the small data packet into the paging request comprises applying one or both of a control plane data encryption key or a control plane data integrity key. Additionally or alternatively, in some examples the paging request further includes header information that indicates the paging request includes the small data packet.

In some examples of the method, apparatuses, or non-transitory computer-readable medium described above, the method is performed by an entity of an evolved packet core. Additionally or alternatively, in some examples the method is performed by a CIoT serving gateway node (C-SGN).

A method of wireless communication is described. The method may include receiving, at a base station from a network node, a paging request associated with a UE, wherein the paging request comprises a small data packet for the UE, transmitting a page to the UE, receiving an access request from the UE, and transmitting the small data packet to the UE responsive to the access request.

An apparatus for wireless communication is described. The apparatus may include means for receiving, at a base station from a network node, a paging request associated with a UE, wherein the paging request comprises a small data packet for the UE, means for transmitting a page to the UE, means for receiving an access request from the UE, and means for transmitting the small data packet to the UE responsive to the access request.

A further apparatus for wireless communication is described. The apparatus may include a processor, memory in electronic communication with the processor, and instructions stored in the memory, wherein the instructions are executable by the processor to receive, at a base station from a network node, a paging request associated with a UE, wherein the paging request comprises a small data packet for the UE, transmit a page to the UE, receive an access request from the UE, and transmit the small data packet to the UE responsive to the access request.

A non-transitory computer-readable medium storing code for wireless communication is described. The code may include instructions executable to receive, at a base station from a network node, a paging request associated with a UE, wherein the paging request comprises a small data packet for the UE, transmit a page to the UE, receive an access request from the UE, and transmit the small data packet to the UE responsive to the access request.

Some examples of the method, apparatuses, or non-transitory computer-readable medium described above may further include receiving an acknowledgement from the UE indicating correct reception of the small data packet, and transmitting, to the network node, a confirmation that the small data packet was delivered to the UE.

Some examples of the method, apparatuses, or non-transitory computer-readable medium described transmitting the small data packet to the UE includes transmitting the small data packet in a control plane message associated with a signaling radio bearer. Additionally or alternatively, in some examples the control plane message comprises a message of a random access procedure comprising the access request.

Some examples of the method, apparatuses, or non-transitory computer-readable medium described above may further include receiving, in the random access procedure, a connection request message comprising a small data request field. In some examples of the method, apparatuses, or non-transitory computer-readable medium described above, the transmitting comprises transmitting the small data packet to the UE in a connection establishment message responsive to the connection request message.

In some examples of the method, apparatuses, or non-transitory computer-readable medium described above, the page to the UE includes an indication that the small data packet is to be transmitted. Additionally or alternatively, in some examples the access request is received on a set of physical random access channel (PRACH) resources associated with connectionless transfer of small data packets.

A method of wireless communication is described. The method may include receiving, at a UE, a page from a base station, initiating a random access procedure by transmitting an access request to the base station responsive to the page, receiving a small data packet in a control plane message prior to activation of a dedicated radio bearer for a data connection with the base station, and acknowledging the small data packet.

An apparatus for wireless communication is described. The apparatus may include means for receiving, at a user equipment (UE), a page from a base station, means for initiating a random access procedure by transmitting an access request to the base station responsive to the page, means for receiving a small data packet in a control plane message prior to activation of a dedicated radio bearer for a data connection with the base station, and means for acknowledging the small data packet.

A further apparatus for wireless communication is described. The apparatus may include a processor, memory in electronic communication with the processor, and instructions stored in the memory, wherein the instructions are executable by the processor to receive, at a UE, a page from a base station, initiate a random access procedure by transmitting an access request to the base station responsive to the page, receive a small data packet in a control plane message prior to activation of a dedicated radio bearer for a data connection with the base station, and acknowledge the small data packet.

A non-transitory computer-readable medium storing code for wireless communication is described. The code may include instructions executable to receive, at a UE, a page from a base station, initiate a random access procedure by transmitting an access request to the base station responsive to the page, receive a small data packet in a control plane message prior to activation of a dedicated radio bearer for a data connection with the base station, and acknowledge the small data packet.

In some examples of the method, apparatuses, or non-transitory computer-readable medium described above, the control plane message is part of the random access procedure. Additionally or alternatively, in some examples the control plane message is a random access response message of the random access procedure.

Some examples of the method, apparatuses, or non-transitory computer-readable medium described above may further include transmitting, in a connection request message, a small data request field. Additionally or alternatively, in some examples the small data packet is received in a connection establishment message sent in response to the connection request message.

In some examples of the method, apparatuses, or non-transitory computer-readable medium described above, the access request is transmitted on a set of physical random access channel (PRACH) resources associated with connectionless transfer of small data packets.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
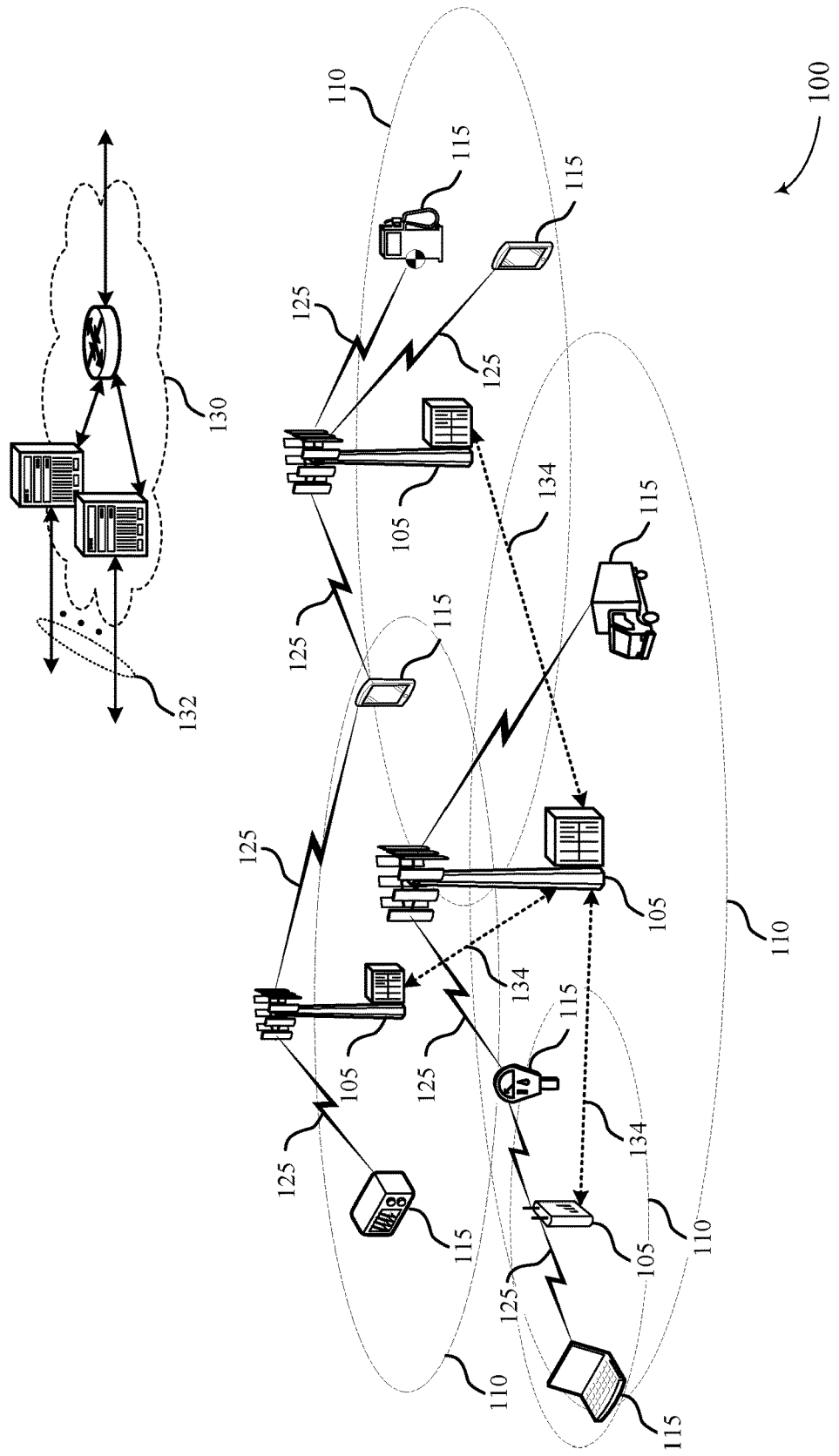
FIG. 1 illustrates an example of a wireless communications system that supports small data transmission in a wireless communications system in accordance with various aspects of the present disclosure.

The described features generally relate to improved systems, methods, or apparatuses for transmission of small data packets through a paging procedure in a MTC or cellular internet of things system (CIoT). As discussed above, some wireless systems may provide for automated communication such as MTC or Machine-to-Machine (M2M) communication. M2M or MTC may refer to technologies that communicate without human intervention and that may operate in a CIoT. In some cases, MTC devices may have limited capabilities. For example, while some MTC devices may have broadband capacity, other MTC devices may be limited to narrowband communications. This narrowband limitation may, for example, interfere with the ability of an MTC device to receive control channel information using the full bandwidth served by a base station. In some wireless communication systems, such as Long Term Evolution (LTE), an MTC device having limited bandwidth capability (or another device with similar capabilities) may be referred to as a category 0 device.

As discussed above, in some cases, MTC devices may transmit or receive relatively small amounts of data on a relatively infrequent basis. In such cases, the overhead associated with establishing a radio resource control (RRC) connection may consume a significant amount of resources relative to the resources needed to transmit the small amounts of data. The increased power consumption from repeatedly establishing an RRC connection for communication of small amounts of data may reduce the battery life of a UE and decrease the usefulness of the device. Furthermore, the network resources used for overhead in establishing RRC connections for transmissions of small amounts of data may reduce the efficiency of a wireless communications system. Various aspects of the disclosure provide for connectionless transmission of small data, in which relatively small amounts of data may be transmitted without establishing an RRC connection, thus allowing a UE to remain in idle mode while receiving the small data. Such techniques may provide for efficient transmission of such small data with reduced overhead, and may thus enhance the overall efficiency of a wireless communications system.

A small data transmission or a small data packet, as used in the present disclosure, refers to an amount of data that may be transmitted in a payload of a random access message or other connection establishment message. For example, if a maximum random access message payload may include 144 bits, a corresponding small data transmission or small data packet may include 144 bits or fewer. The amount of data that may be included in a small data transmission or small data packet may be dependent upon the system configuration for a particular wireless communications system and an amount of data that may be included in a message payload used for transmission of the small data transmission or small data packet. In some examples, if an amount of data exceeds a size limit for a small data transmission or small data packet, the data may be transmitted in two or more successive connectionless transmissions.

In some examples, a core network component, such as a CIoT serving gateway node (C-SGN), may receive data to be transmitted to a user equipment (UE), such as an MTC device, and may determine that a small data packet transmission may be initiated for the data. The core network may format the small data packet into a paging request that combines paging information and the data, and transmit the paging request to a base station. The base station may receive the paging request, and initiate a page process with the UE. The base station may, in some examples, transmit a page message to the UE that indicates a small data transmission is to be sent. The UE may receive the page message, and initiate an access procedure that may be used for transmission of the small data. The UE may, for example, transmit a random access request to the base station responsive to the page message, and the base station may transmit the data to the UE as part of a random access response message to the UE.

In some examples, a three message procedure may be used, in which a base station may transmit a paging request with dedicated preamble assignment. The UE may then transmit on a physical random access channel (PRACH) using the dedicated preamble assignment. The base station may then provide the small data packet in the random access response (RAR) message. In other examples, a five message procedure may be used, in which a base station may transmit a paging request, which may include a small data indication, and may or may not include a dedicated preamble assignment. The UE may receive the paging request and perform an RRC connection establishment procedure, which may correspond to an established three-message RRC connection establishment procedure. The UE, as part of the RRC connection establishment procedure, may indicate a small data connection request (e.g., in MSG1 or MSG3 of established RRC connection procedures). The base station may then provide the small data packet as part of a RRC connection message transmitted to the UE (e.g., in MSG4 of established RRC connection procedures). The UE may receive the small data packet, and the base station may then either keep the RRC connection established for a certain time in case the UE needs to send a reply, or may release the RRC connection and return the UE to idle mode.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For example, although the scenarios are described with respect to MTC devices, the techniques described herein may be used with a variety of other type wireless communications devices and systems. In addition, the methods described may be performed in an order different from that described, and various steps may be added, omitted, or combined. Also, features described with respect to some examples may be combined in other examples.

Aspects of the disclosure are initially described in the context of a wireless communication system. Specific examples are then described for small data transmission through paging in MTC. These and other aspects of the disclosure are further illustrated by and described with reference to apparatus diagrams, system diagrams, and flowcharts that relate to small data transmission through paging in MTC.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. In some aspects of the disclosure, small data transmissions may be provided to UEs 115 through a paging procedure in which a UE 115 may remain in idle mode for reception of small data transmission without establishing an RRC connection to transmit the small data transmission.

As mentioned above, some types of wireless devices may provide for automated communication implementing M2M communications or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program. The central server or application program can then make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

A UE 115 may enter an idle mode and periodically wake up to receive paging messages. In some cases, a component of core network 130 (e.g., a C-SGN as will be discussed in more detail below), may receive data to be transmitted to a UE 115, and may determine that a small data packet transmission may be initiated for the data. The core network 130 may format the small data packet into a paging request that combines paging information and the data, and transmit the paging request to a base station 105, which may receive the paging request and initiate a page process with a UE 115. In some examples, a connectionless transmission of the data may be performed in which a base station 105 may transmit the small data packet to the UE without completing establishment of an RRC connection and/or a network attach procedure with the UE. For example, the base station may transmit a page message to the UE 115 that indicates a small data transmission is to be sent. The UE 115 may receive the page message, and initiate an access procedure that may be used for transmission of the small data packet. The UE 115 may, for example, transmit a random access request to the base station 105 responsive to the page message, and the base station 105 may transmit the data to the UE 115 as part of the random access procedure. In some examples, the base station 105 may transmit an acknowledgment to the core network 130 that the small data packet has been delivered. In some examples, the base station 105 may transmit the small data packet in a transmission after the random access procedure but before any dedicated radio bearers or data session context have been established (e.g., prior to completion of a network attach procedure, etc.).

Figure 2:
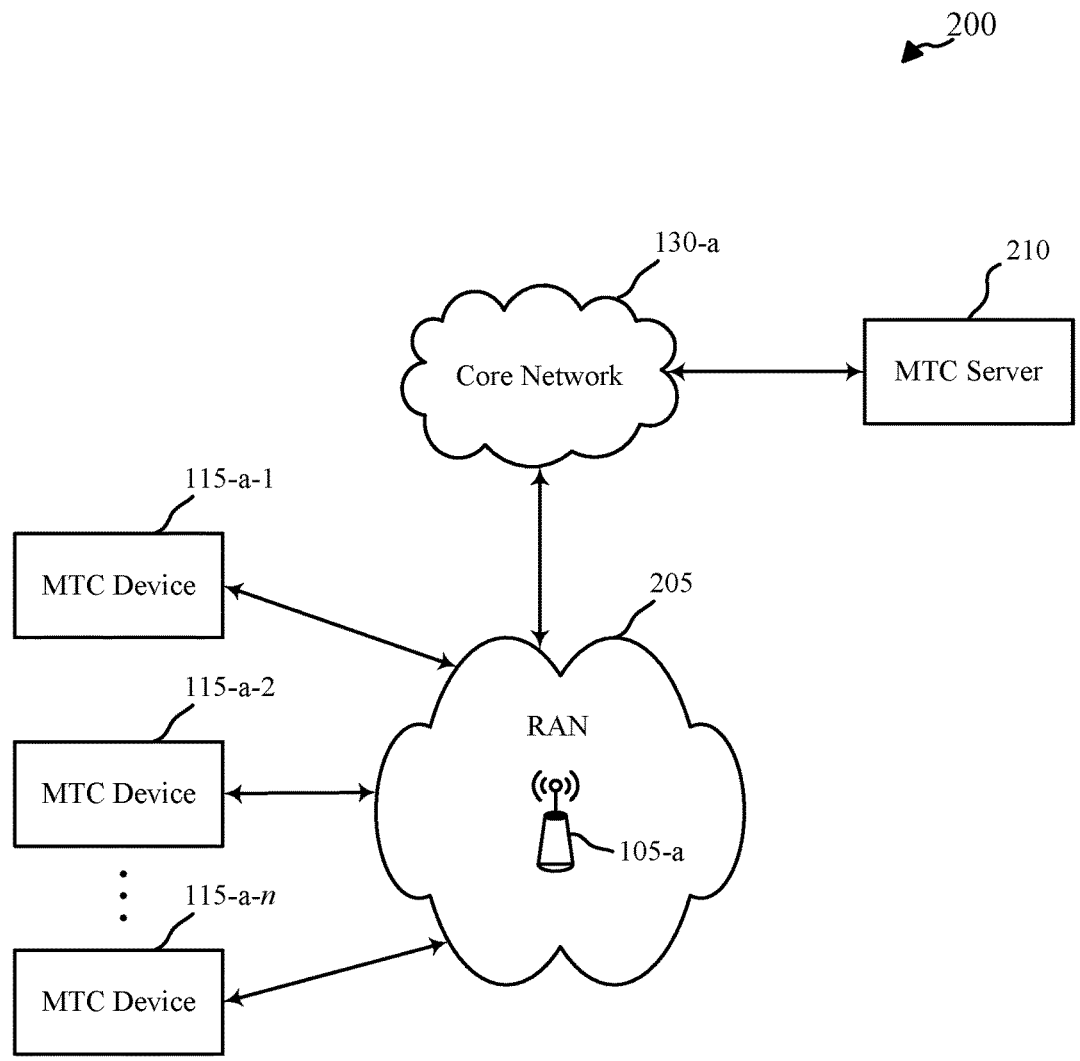
FIG. 2 illustrates an example of a wireless communications subsystem that supports small data transmission in a wireless communications system in accordance with various aspects of the present disclosure.

FIG. 2 illustrates an example of a wireless communication system 200 including a Radio Access Network (RAN) 205 implementing a machine type communication service according to one aspect. The system 200 may include a number of MTC devices 115-a and an MTC server 210. Communications between the MTC server 210 and MTC devices 115 may be routed through a core network 130-a to a base station 105-a that may be considered part of the RAN 205, and may be referred to in some examples as a RAN node. The base station 105-a may be an example of the base stations illustrated in FIG. 1. The MTC devices 115-a may be examples of the MTC devices 115 illustrated in FIG. 1. One skilled in the art would understand that the quantity of MTC devices 115-a, core networks 130-a, RANs 205, and MTC servers 210 shown in FIG. 2 is for illustration purposes only and should not be construed as limiting.

The wireless communication system 200 may be operable to facilitate machine type communication between one or more MTC devices 115-a and/or one or more MTC servers 210. Machine type communication may include communications between one or more devices without human intervention. In one example, machine type communication may include the automated exchange of data between a remote machine, such as an MTC device 115-a, and a back-end IT infrastructure, such as the MTC server 210, without user intervention. Such data may include a relatively small amount of data, such as discussed above, and various aspects of the disclosure provide for efficient transmission of data to a MTC device 115 through connectionless small data transmission. The transfer of data from the MTC server 210 to an MTC device 115-a via the base station 105-a may be performed, in some examples, without requiring establishment of an RRC connection. Such techniques may enhance the efficiency of system 200 by removing certain network access stratum (NAS) procedures and RRC connection establishment messages, for example.

Figure 3:
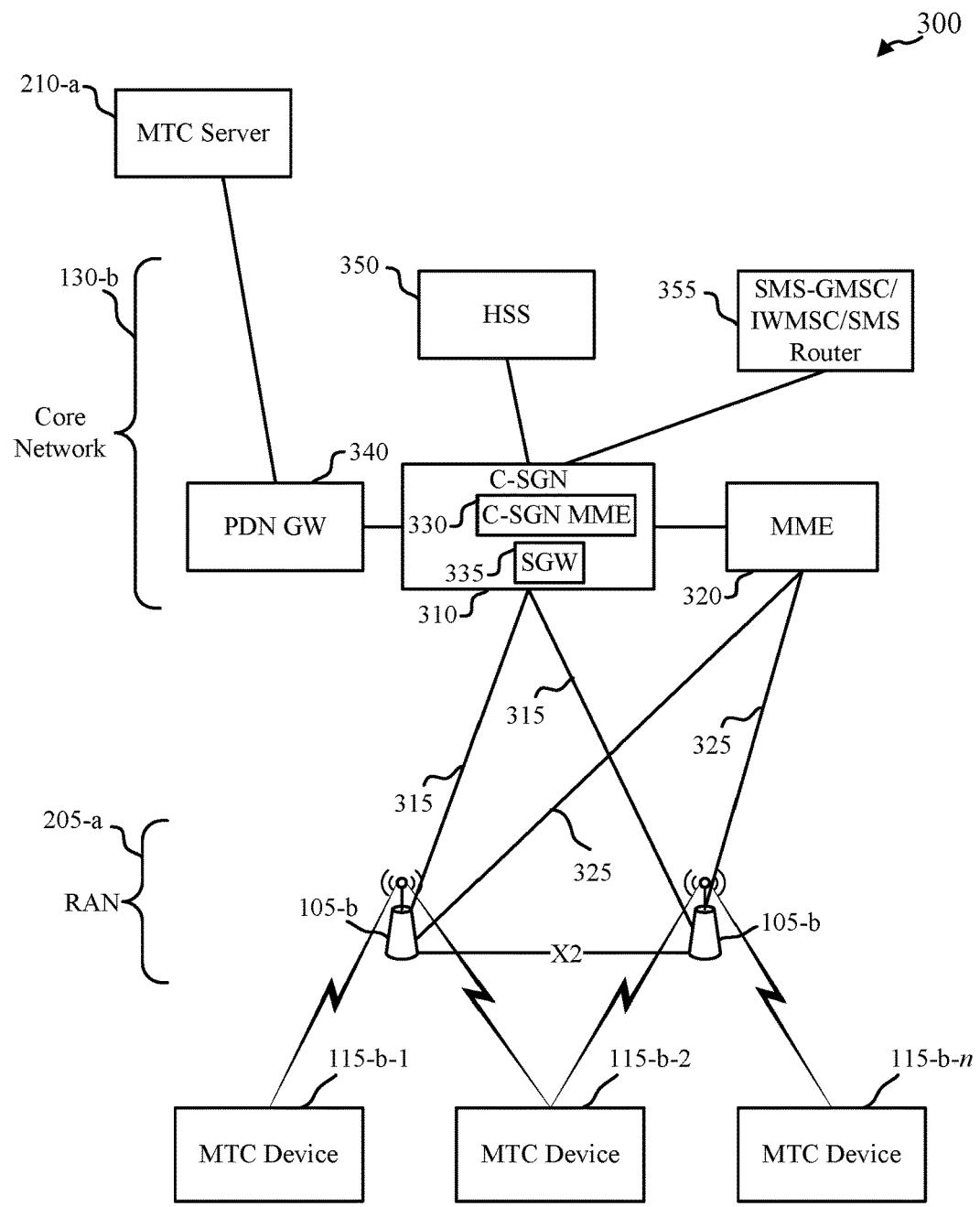
FIG. 3 illustrates an example of a wireless communication system that supports small data transmission in a wireless communications system in accordance with various aspects of the present disclosure.

FIG. 3 illustrates an example of a wireless communications system implementing a machine type communication service over a CIoT network 300, such as a LTE/LTE-Advanced network, in accordance with various aspects of the disclosure. The CIoT network 300 may include core network 130-b and RAN 205-a, which may be examples of core networks 130 of FIG. 1 and RAN 205 of FIG. 2, respectively. The core network 130-b may include a Packet Data Network Gateway (PDN GW) 340. The PDN GW 340 may be connected to one or more MTC servers 210-a, either directly or through a network connection such as an Internet Protocol (IP) Network (e.g., Operator IP Networks or external IP Networks).

Core network 130-b may include one or more short message service (SMS) gateway mobile switching center (SMS-GMSC), inter working MSC (IWMSC), or SMS router 355. Additionally, the core network 130-b may include a home subscriber service (HSS) 350 node that may provide, for example, service authorization and/or user authentication for MTC devices 115-b. In the example of FIG. 3, a CIoT service gateway node (C-SGN) 310 may be connected with PDN GW 340, HSS 350, SMS-GMSC/IWMSC/SMS router 355, or a mobility management entity (MME) 320. The MME 320 may provide bearer and connection management. In some examples, C-SGN 310 may include an internal C-SGN MME 330, and may also include an internal Serving Gateway 335 that may transfer user IP packets between base stations 105 and other network endpoints (e.g., PDN GW 340, etc.). In some examples, C-SGN MME 330 may manage small data transmission mobility functions, and MME 320 may handle intra-radio access technology (RAT) mobility functions and/or UE tracking management. The SGW 335 and the C-SGN MME 330 are illustrated as part of C-SGN, although these core network components may be implemented in different physical nodes, and in some examples functions of MME 320 and C-SGN MME 330 may be combined into a single component (e.g., within MME 320, etc.).

RAN 205-a may include one or more base stations or eNBs 105-b, which provide user and control plane protocol terminations for UEs (e.g., MTC devices 115) over the air interface of the LTE network. Base stations 105-b may be connected with an X2nterface for intra-eNB communication. Base stations 105-b may be connected to C-SGN 310 over an S1 interface 315 for communicating data traffic and/or control plane information. Similarly, base stations 105-b may be connected to MME 320 over an S1 interface 325 for communicating data traffic and/or control plane information. The MTC devices 115-b may be configured to collaboratively communicate with multiple base stations 105-b through, for example, Multiple Input Multiple Output (MIMO), Coordinated Multi-Point (CoMP), or other schemes.

Figure 4:
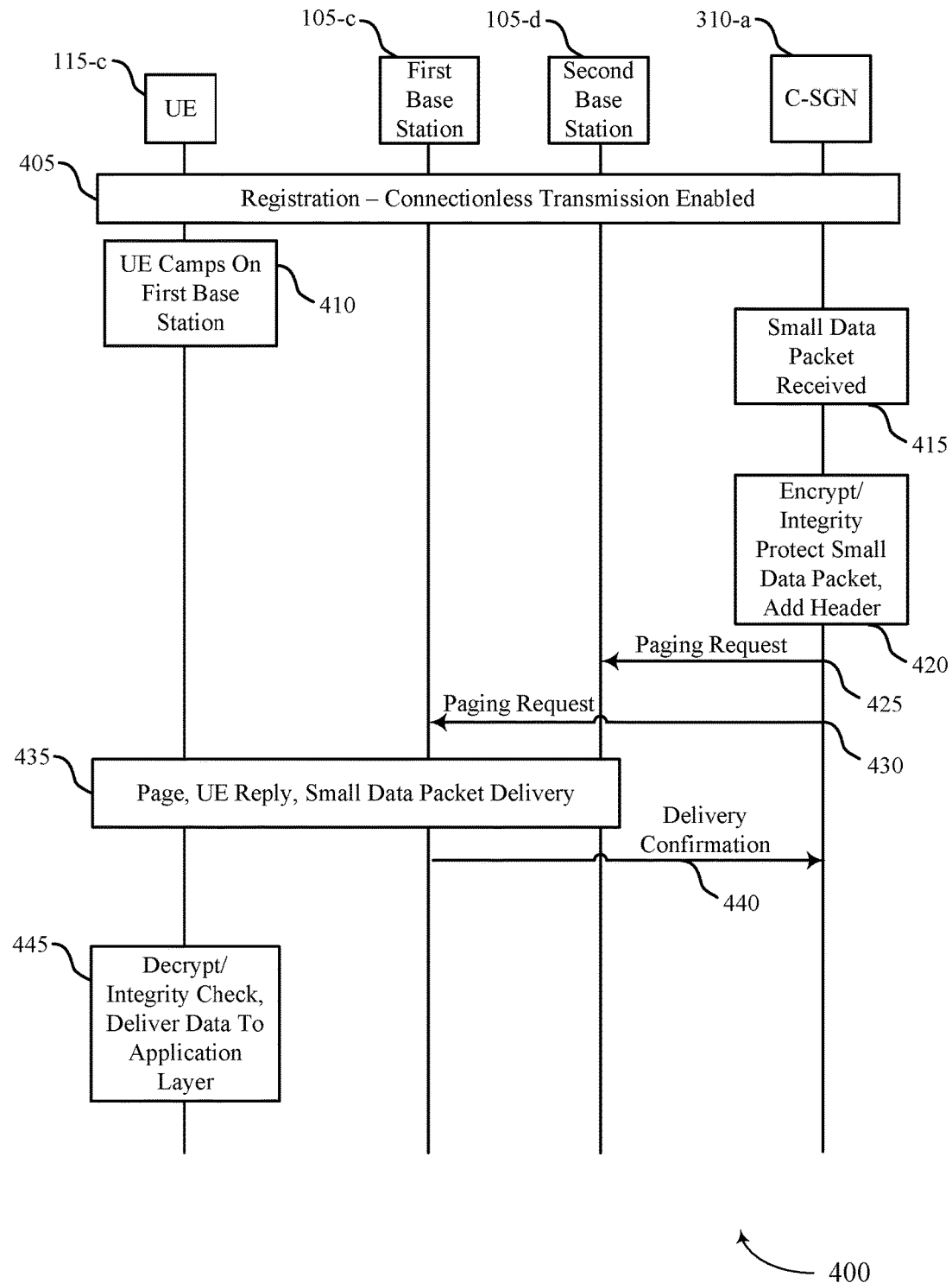
FIG. 4 illustrates an example of a process flow that supports small data transmission in a wireless communications system in accordance with various aspects of the present disclosure.

FIG. 4 illustrates an example of a process flow 400 for small data transmission in a wireless communications system in accordance with various aspects of the present disclosure. Process flow 400 may include a UE 115-c, first base station 105-c, second base station 105-d, and C-SGN 310-a which may be examples of a UE 115 and base station 105 described with reference to FIGS. 1-3 and of a C-SGN 310 described with reference to FIG. 3. Initially, at block 405, UE 115-c may be registered with C-SGN 310-a and may be configured for connectionless small data transmissions. For example, during a registration procedure, such as an attach or registration update procedure, the UE 115-c and C-SGN 310-a may enable connectionless transmission and set up the required UE 115-c context, including security context for encrypting/integrity protecting small data packets in both uplink and downlink.

A small data transmission or a small data packet, as used in the present disclosure, refers to an amount of data that may be transmitted in a payload of a random access message or other control plane message used in connection establishment. For example, if a maximum random access message payload may include 144 bits, a corresponding small data transmission or small data packet may include 144 bits or fewer. The amount of data that may be included in a small data transmission or small data packet may be dependent upon the system configuration for a particular wireless communications system and an amount of data that may be included in a message payload used for transmission of the small data transmission or small data packet. In some examples, if an amount of data exceeds a size limit for a small data transmission or small data packet, the data may be transmitted in two or more successive connectionless transmissions.

The UE may camp on the first base station 105-c, as indicated at block 410. The base stations 105 may be, in some examples, part of a network cluster (e.g., tracking area), and when UE 115-c camps on the first base station 105-c, the first base station 105-c may be associated with the UE 115-c. At block 415, the C-SGN may receive a small data packet that is to be transmitted to UE 115-c, which may be in idle mode. The C-SGN 310-a may identify that connectionless transmission is configured and enabled for UE 115-c, and may select the base stations 105 in which to page the UE 115-c. As mentioned above, two or more base stations 105 may be part of a network cluster and C-SGN 310-a (or an MME internal to or associated with C-SGN) may identify base station 105-c and base station 105-d as being associated with UE 115-c (e.g., covering a tracking area for UE 115-c, etc.). The C-SGN 310-a may, for example, identify that one or more base stations (e.g., first base station 105-c and second base station 105-d) that have received a small data packet or signaling from the UE 115-c within a defined time period. Typically, data plane encryption and integrity may be performed in the RAN (e.g., between base station 105 and UE 115) using access stratum security keys. However, because the UE 115-c is in the idle state and no dedicated radio bearers are configured, the security context in the base stations 105-c or 105-d may not be established for protection and integrity of data transfers to the UE 115-c. The C-SGN 310-a may instead encrypt and integrity protect the small data packet using control plane level encryption and integrity protection between the C-SGN 310-a and the UE 115-c. For example, the C-SGN 310-a may apply a control plane encryption key (e.g., $K_{NASenc}$) and/or a control plane integrity key (e.g., $K_{NASint}$). The C-SGN 310-a may also add a header to the data, as indicated at block 420, which may indicate to the RAN (e.g., base stations 105-c and/or 105-d) that the data is a small data packet for connectionless transfer.

The C-SGN 310-a then transmits paging request 425 to the second base station 105-d and paging request 430 to the first base station 105-c. For example, the C-SGN 310-a may transmit the paging requests 430, 425 to base stations 105-c and 105-d over an S1 interface (e.g., S1 interface 315) using an S1 Application Protocol (S1AP) Paging message. In some examples, the paging requests 425 and 430 include established paging request content such as UE identity and paging information, as well as the small data packet (e.g., encrypted and integrity protected). In some examples, the paging requests 425 and 430 may include security information to be provided to the UE for decrypting and integrity checking the data. At block 435, the first base station 105-c and UE 115-c perform a small data packet transfer procedure 435 that may include transmitting a page to the UE 115-c, receiving a reply by the UE 115-c (e.g., random access response), and transfer of the small data packet, as will be discussed in more detail below. In some examples, the C-SGN 310-a may wait a defined time period for a confirmation of delivery 440, and if no confirmation is received, the C-SGN 310-a may retransmit the paging requests 425, 430. Retransmission of the paging requests 425, 430 may be performed a configurable number of times. At block 445, the UE 115-c may decrypt, integrity check, and deliver the received data to a higher layer, such as an application layer for use by one or more applications running on the UE 115-c.

Figure 5:
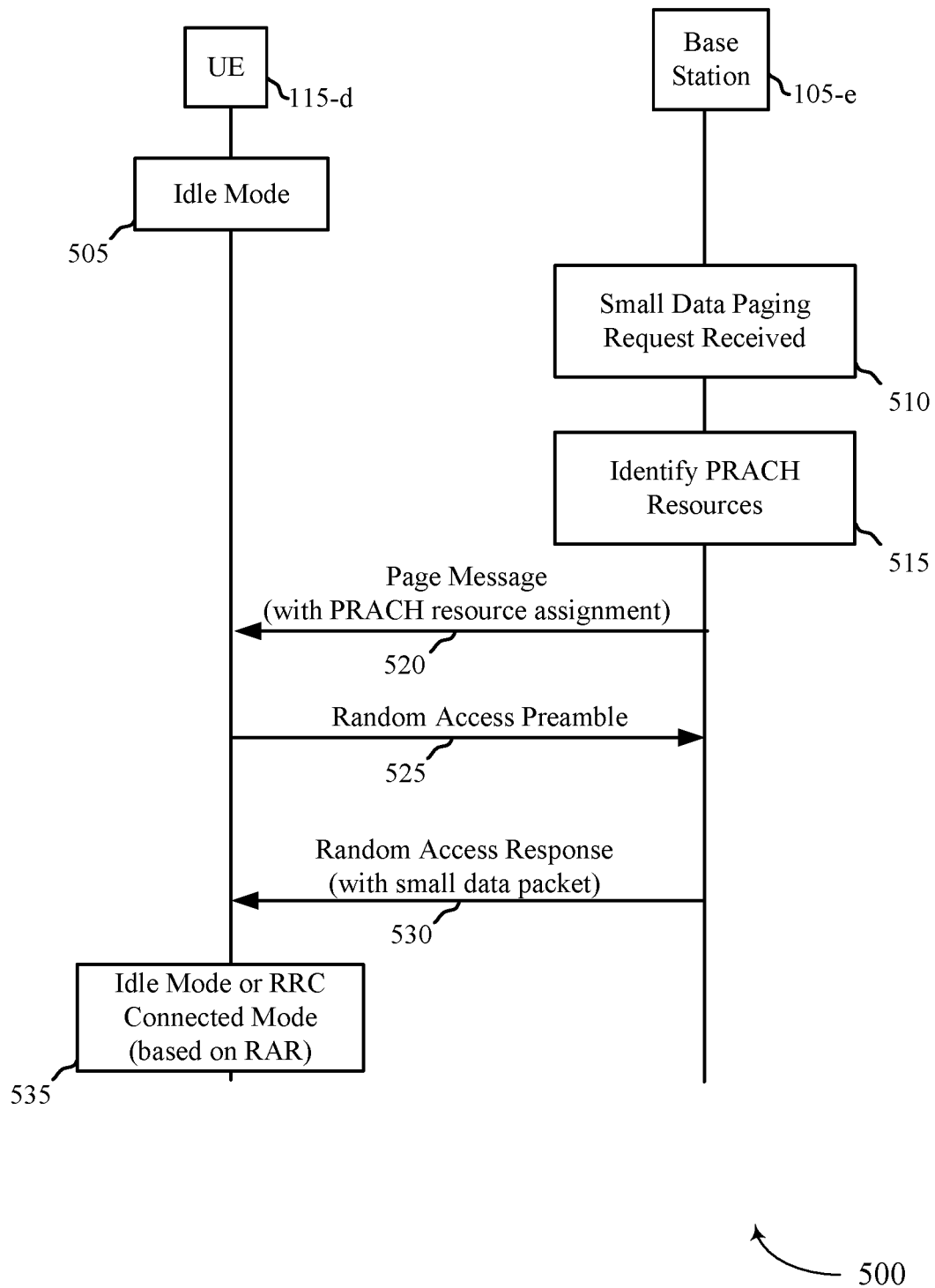
FIG. 5 illustrates another example of a process flow that supports small data transmission in a wireless communications system in accordance with various aspects of the present disclosure.

FIG. 5 illustrates an example of a process flow 500 for a small data packet transfer procedure in a wireless communications system in accordance with various aspects of the present disclosure. Process flow 500 may include a UE 115-d and base station 105-e, which may be examples of UEs 115 and base stations 105 described with reference to FIGS. 1-4. Initially, at block 505, UE 115-d is in idle mode. At block 510, the base station 105-e may receive a small data paging request (e.g., from a C-SGN, etc.). Such a small data paging request may, as discussed above, include paging information for the UE 115-d as well as a small data packet to be transmitted to the UE 115-d. When the base station 105-e receives the paging request including a small data packet, as mentioned above, the base station 105-e pages the UE 115-d, and if the UE 115-d replies to the paging delivers the small data packet to the UE 115-d.

In some aspects, such as illustrated in the example of FIG. 5, delivery of the small data packet may be performed through a message of a random access procedure. In this example, at block 515, the base station 105-e may identify PRACH resources for a random access request and may include the PRACH resources in the page message to the UE 115-d. The PRACH resources may include time, frequency, and/or preamble resources for a random access request, which may be selected from a set of available PRACH resources that are configured for use with connectionless small data transmission. For example, identified PRACH resources may be an index to a pre-defined set of PRACH resources, which may be defined or semi-statically configured and broadcast in a system information block (SIB). In some examples, the PRACH resource assignment may have an expiration time or may have a maximum number of attempts, following which, if UE 115-d does not succeed, the UE 115-d may discontinue using the identified PRACH resources.

Following the identification of PRACH resources, the base station 105-e transmits page message 520, which in this example includes the dedicated PRACH resource information. The UE 115-d transmits random access preamble 525 using the identified PRACH resources. The base station 105-e may then transmit random access response 530, which includes the small data packet as a payload. The small data packet may, for example, take the place of the timing advance, uplink grant, and/or cell radio network temporary identifier (C-RNTI) fields in the random access response 530. The UE 115-d may then maintain idle mode, or enter a connected mode (if instructed to do so in the random access response 530), as indicated at block 535. In such a manner, the UE 115-d performs contention-free random access using the dedicated resources, and the random access response message contains the small data packet. Such a technique may provide for reliable random access response reception, and the UE 115-d may perform the random access procedure a number of times until the random access response is received. In some examples, besides the small data packet, the random access response may also contain an uplink grant, which may be used to send data originated at the UE 115-d or to send an acknowledgment to indicate correct reception of data. In certain examples, the random access response also may include an indication for the UE to continue with the RRC connection, in cases where the base station 105-e may determine to proceed with establishing the RRC connection with the UE 115-d. The UE 115-d may then transmit a connection setup message (e.g., in the resources granted in the uplink grant). The random access response message, in further examples, may include a connection release indication, that may indicate that the UE 115-d may go back to idle mode upon reception of the small data packet. Such a connection release indication may, in other examples, be based on the absence of an indication to continue with the RRC connection or other field in the random access response (e.g., timing advance, uplink grant, C-RNTI). The UE 115-*d* may provide an acknowledgement to the base station 105-*e* of successful reception of the small data packet (not shown). The acknowledgement may be transmitted, for example, via uplink resources of an uplink control channel (e.g., PUCCH) or uplink data channel (e.g., PUSCH) provided in the random access response or based on resources associated with the random access response (e.g., random access RNTI (RA-RNTI), PDSCH location of random access response, etc.). In some examples, the base station 105-*e* may confirm to the C-SGN (e.g., C-SGN 310 of FIGS. 3-4) that the small data packet was delivered (not shown).

Figure 6:
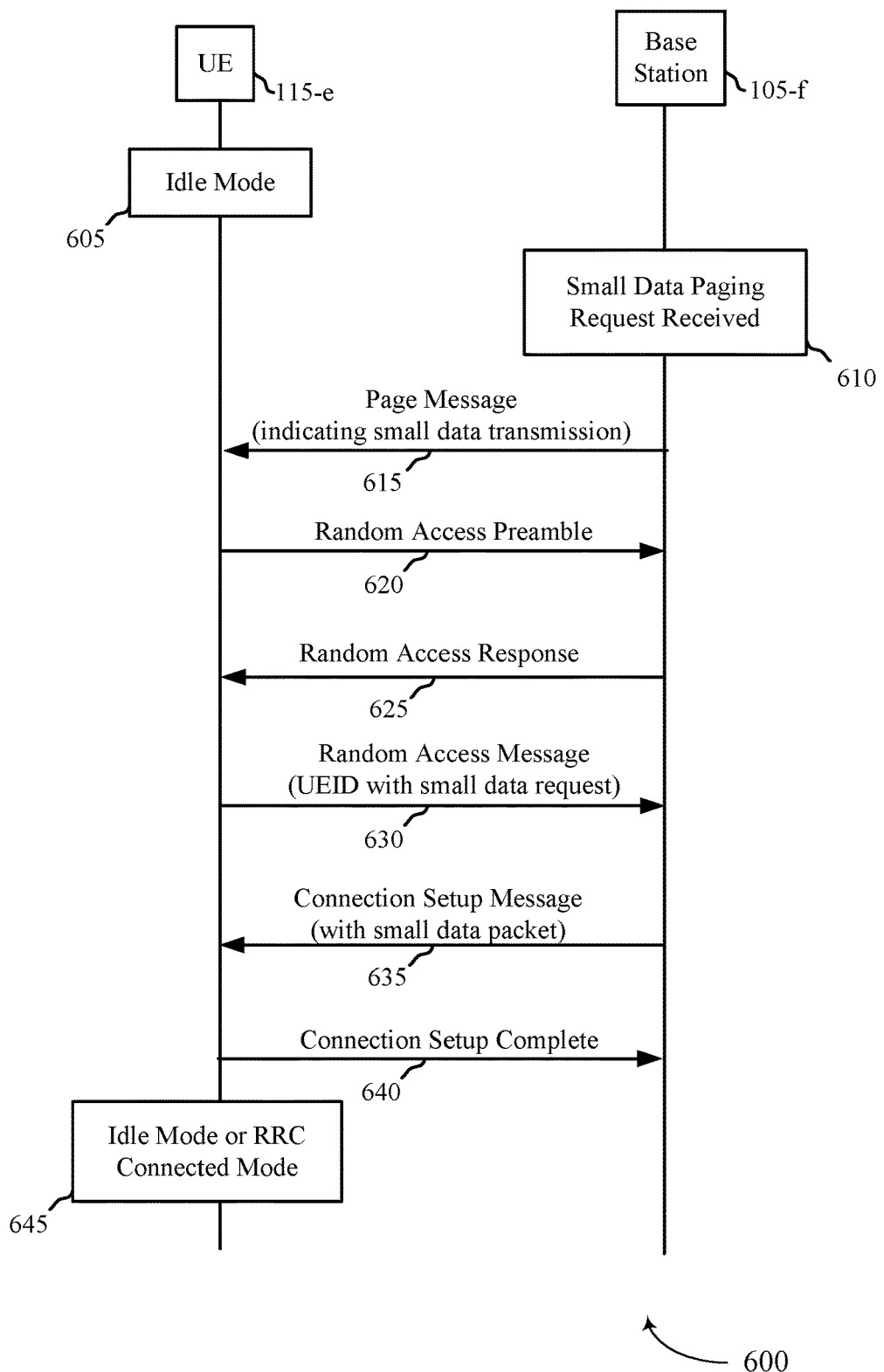
FIG. 6 illustrates another example of a process flow that supports small data transmission in a wireless communications system in accordance with various aspects of the present disclosure.

FIG. 6 illustrates an example of a process flow 600 for a small data packet transfer procedure in a wireless communications system in accordance with various aspects of the present disclosure. Process flow 600 may include a UE 115-*e* and base station 105-*f*, which may be examples of a UEs 115 and base stations 105 described with reference to FIGS. 1-5. Initially, at block 605, UE 115-*e* is in idle mode. At block 610, the base station 105-*f* may receive a small data paging request. Such a small data paging request may, as discussed above, include paging information for the UE 115-*e* as well as a small data packet to be transmitted to the UE 115-*e*. When the base station 105-*f* receives the paging request including a small data packet, as mentioned above, the base station 105-*f* pages the UE 115-*e*, and if the UE 115-*e* replies to the paging, the base station 105-*f* delivers the small data packet to the UE 115-*e*.

In some aspects, such as illustrated in the example of FIG. 6, delivery of the small data packet may be performed through a random access request RRC connection establishment messaging. In this example, base station 105-*f* transmits page message 615, which may indicate that a small data transmission is to be delivered to the UE 115-*e*. In some examples the page message 615 may optionally include a dedicated random access preamble assignment (which may be used to indicate a small data transmission). The UE 115-*e* may then perform an RRC connection establishment procedure by transmitting random access preamble 620, followed by random access response 625 from the base station 105-*f*, followed by random access message 630 (e.g., RRC connection setup request) from the UE 115-*e*. In certain examples, the random access response 625 may follow a legacy random access procedure, and may contain an uplink grant for the random access message 630. In some examples, the random access message 630 may include a UE identification and an indication that the UE can receive the small data packet in the next message. In certain examples, the random access message 630 may include other data originated at the UE 115-*e*. In some examples, the random access preamble may include an indication the connection is for a small data request. The base station 105-*f* then transmits connection setup message 635, which may include the small data packet as a payload. The connection setup message 635, in some examples, also may include a UE identification and an indication to release the connection or to complete an RRC connection. The UE 115-*e* may then respond with connection setup complete message 640, which may include an acknowledgement to the base station 105-*f* of successful reception of the small data packet. The UE 115-*e* may resume idle mode or enter RRC connected mode based on the connection setup message at 645.

Although an RRC connection is established between UE 115-*e* and base station 105-*f* after the connection setup complete message 640, the network (e.g., RAN) associated with base station 105-*f* has not yet established a data security context or any dedicated radio bearers (e.g., default bearer, etc.) for transfer of data between other network entities (e.g., PDN-GW, etc.) and the UE 115-*f*. In some examples, the small data packet may instead be sent in messaging from the base station 105-*f* after the connection setup complete message 640 but prior to an attach procedure used to establish the security context and dedicated radio bearers. For example, the base station 105-*f* may send a message (not shown) after connection setup complete message 640 that includes the small data packet. Encryption and data integrity protection for the small data packet may be maintained because the C-SGN may apply the control plane data encryption key and/or control plane data integrity key to the small data packet included in the small data paging request received at 610, as discussed above. Thus, the small data packet may be sent in a control plane message associated with a signaling radio bearer prior to establishment of any dedicated radio bearers, including the default radio bearer.

As mentioned above, when a UE (e.g., UE 115 of FIGS. 1-6) is paged and receives the small data packet, the UE may decrypt and check the integrity of the small data packet. If the decryption and integrity checks are correct, the UE delivers the small data packet to upper layers. In some examples, the UE may send an integrity protected acknowledgment (ACK) message to the C-SGN (e.g., C-SGN 310 of FIGS. 3-4) confirming correct reception of the small data packet. In the event that decryption fails, the integrity check fails, or another error in reception occurs, the UE may initiate a registration update (e.g. tracking area updating procedure) to resynchronize with the core network. In some examples, the base station 105-*f* may confirm to the C-SGN (e.g., C-SGN 310 of FIGS. 3-4) that the small data packet was delivered to the UE 115-*e*.

Figure 7:
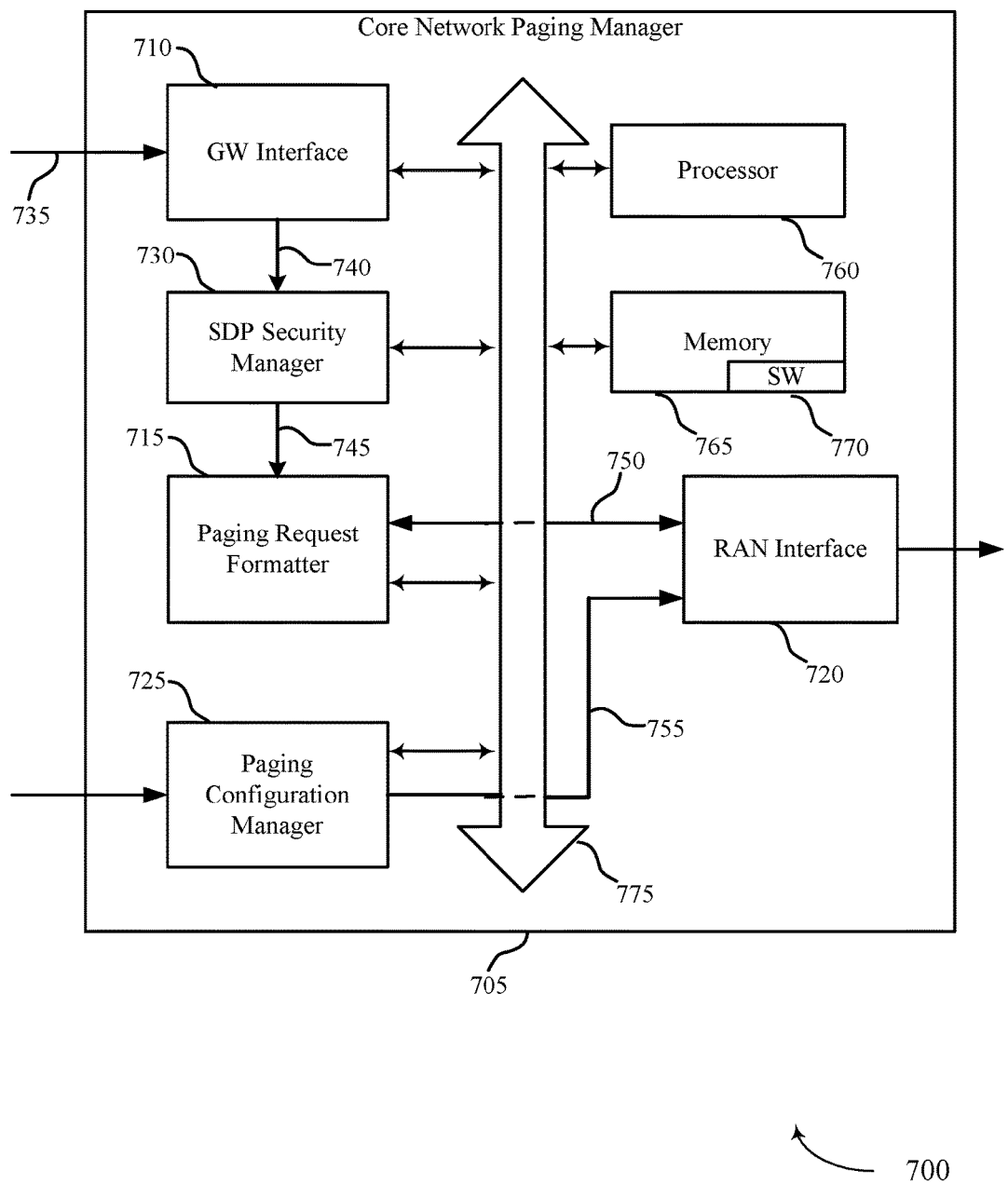
FIG. 7 shows a block diagram of a device that support small data transmission in a wireless communications system in accordance with various aspects of the present disclosure.

FIG. 7 shows a block diagram of a device 700 configured for small data transmission in a wireless communication system in accordance with various aspects of the present disclosure. Device 700 may be an example of aspects of a C-SGN 310 described with reference to FIGS. 1-6. Device 700 may include a core network paging manager 705, which may perform operations related to small data packet transmission as discussed above. The core network paging manager 705 may receive a small data packet to be transmitted to a UE, format the small data packet into a paging request, the paging request including UE identification information and the small data packet, and transmit the paging request to a base station. The core network paging manager 705 may include a gateway (GW) interface 710, a paging request formatter 715, a radio access network (RAN) interface 720, a paging configuration manager 725, and a small data package (SDP) security manager 730, a processor 760, and memory 765 (including software (SW) 770), which each may be in communication, directly or indirectly, with one another (e.g., over bus system 775).

The memory 765 may include RAM and ROM. The memory 765 may also store computer-readable, computer-executable software code 770 containing instructions that are configured to, when executed, cause the processor 760 to perform various functions described herein (e.g., sending small data packets in paging messaging for connectionless transfer, encryption and/or integrity protection of small data packets, etc.). Alternatively, the software 770 may not be directly executable by the processor 765 but be configured to cause the computer, e.g., when compiled and executed, to perform functions described herein. The processor 760 may include an intelligent hardware device, e.g., a CPU, a microcontroller, an ASIC, etc. The processor 760 may include various special purpose processors such as encoders, queue processing modules, base band processors, radio head controllers, digital signal processor (DSPs), and the like.

The gateway interface 710 may receive small data packets 735 to be transmitted to UEs as described with reference to FIGS. 2-6. The gateway interface 735 may be coupled with, for example, a SGW or PDN-GW as discussed with reference to FIGS. 2-6. The gateway interface 710 may pass the received small data packets 740 to the SDP security manager 730. The SDP security manager may be configured with a security context for one or more of encryption or integrity protection of small data packets as described with reference to FIGS. 2-6. For example, the SDP security manager may apply a control plane data encryption key (e.g. $K_{NAsenc}$) or a data integrity key (e.g., $K_{NAsint}$) to the small data packets for UEs to obtain protected small data packets 745. Paging request formatter 715 may format the small data packets into paging requests 750, where each paging request may include UE identification information and a respective small data packet as described with reference to FIGS. 2-6. Paging request formatter 715, in some examples, also may receive a confirmation (e.g., via radio access network interface 720) that the small data packet was delivered to the UE. In some examples, the paging request further provides header information that indicates the paging request includes the small data packet.

The radio access network interface 720 may send the paging request to a base station as described with reference to FIGS. 2-6. In some examples, the paging request may be transmitted to one or more base stations that may be part of a network cluster (e.g., associated with a tracking area), and at least one base station in the network cluster may be associated with the UE (e.g., the UE may be camped on the at least one base station). The radio access network interface 720 may also determine whether a confirmation of delivery of the small data packet is received. The radio access network interface 720 may also retransmit the paging request to the base station in the absence of the confirmation within a defined period of time. Paging configuration manager 725 may configure one or more UEs via configuration packets 755 to enable reception of small data packets in paging requests as described with reference to FIGS. 2-6. In some examples, the UEs may be in idle mode and configured to receive the small data packet in the paging request.

Figure 8:
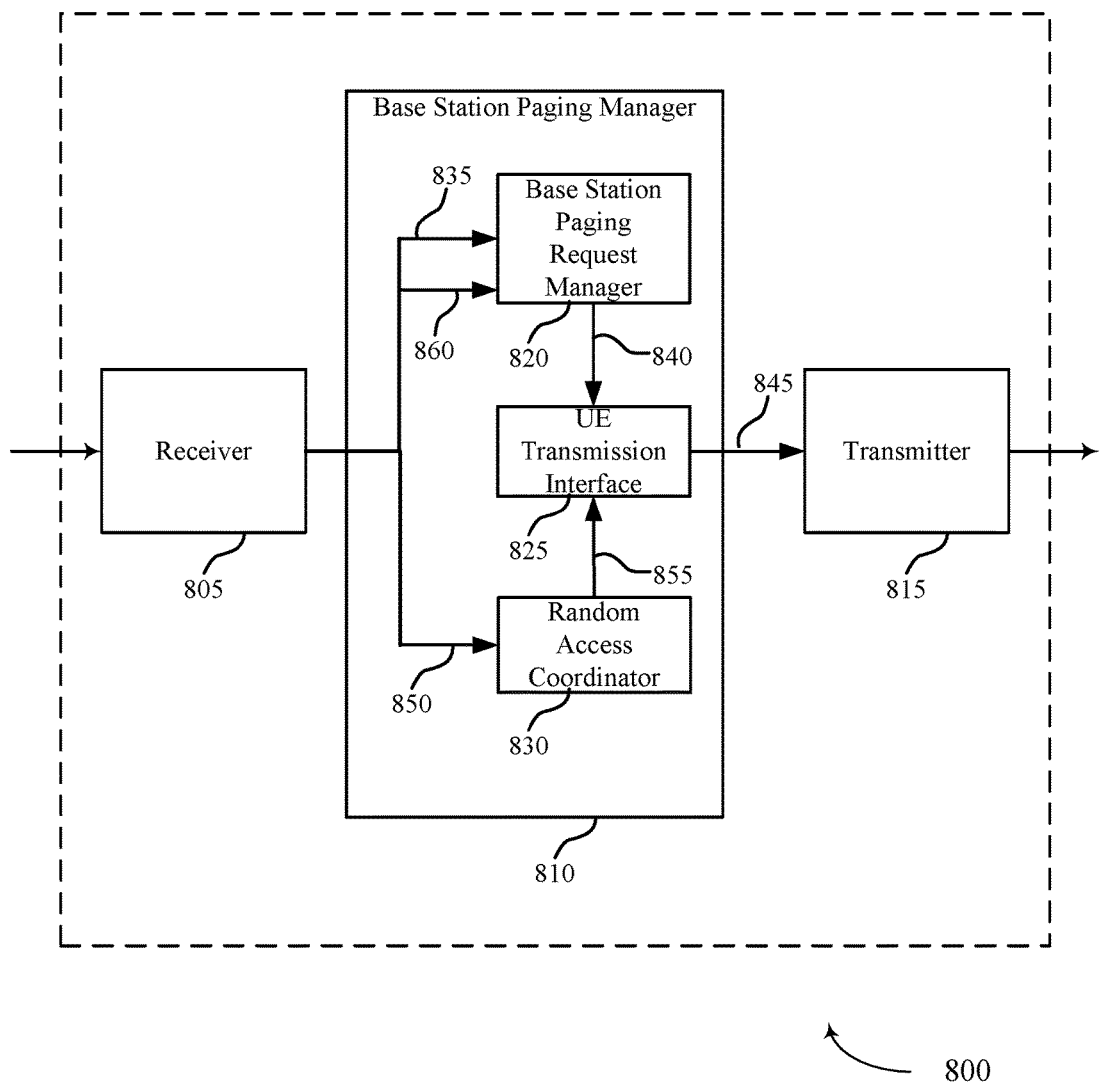
FIG. 8 shows a block diagram of a wireless device, such as a base station or other radio access node, that supports small data transmission in a wireless communication system in accordance with various aspects of the present disclosure.

FIG. 8 shows a block diagram of a wireless device 800 configured small data transmission in a wireless communication system in accordance with various aspects of the present disclosure. Wireless device 800 may be an example of aspects of a base station 105 described with reference to FIGS. 1-6. Wireless device 800 may include a receiver 805, a base station paging manager 810, or a transmitter 815. Wireless device 800 may also include a processor. Each of these components may be in communication with each other.

The receiver 805 may receive information such as packets, user data, or control information associated with various transmissions (e.g., random access requests, and information related to small data transmissions, etc.). Information may be passed on to the base station paging manager 810, and to other components of wireless device 800.

The base station paging manager 810 may receive a paging request from a network node (e.g., a C-GSN, etc.) that includes a UE identification and a small data packet, may transmit a page to the UE, receive an access request from the UE, and transmit the small data packet to the UE responsive to the access request. In certain examples, the base station paging manager 810 may determine paging resources for use in transmitting or receiving paging messages. The base station paging manager 810 may include a base station paging request manager 820, a UE transmission interface 825, and a random access coordinator 830.

The transmitter 815 may transmit signals received from other components of wireless device 800. In some examples, the transmitter 815 may be collocated with the receiver 805 in a transceiver module. The transmitter 815 may include a single antenna, or it may include a plurality of antennas.

The base station paging request manager 820 may receive a paging request 835 from a core network component, such as C-SGN 310 described above with respect to FIGS. 3-4. The UE transmission interface 825 may manage transmission (e.g., via transmitter 815) of communications 845 to UEs served by the base station (e.g., page(s), uplink grants, radio resource control setup messages, or connection release indications as described with reference to FIGS. 2-6) by sending paging management information 840 to UE transmission interface 825. In some examples, the page to the UE includes an indication that the small data packet is to be transmitted. The base station paging request manager 820 may also receive acknowledgements 860 (e.g., via receiver 805) confirming that small data packets have been delivered to UEs. The base station paging request manager 820 may confirm delivery to of the small data packet to the core network component.

The random access coordinator 830 may receive an access request 850 from the UE as described with reference to FIGS. 2-6. The random access coordinator 830 may also transmit the small data packet to the UE responsive to the access request, assign a set of resources to the UE for use in transmitting the access request, and may include an indication of the assigned set of resources in a page in communication 855 utilizing transmitter 815 via UE transmission interface 825. The small data packet may, for example, take the place of the timing advance, uplink grant, and/or C-RNTI fields in the random access response. The set of resources may be resources of a physical random access channel (PRACH) associated with connectionless transfer of small data packets. In some examples, the set of resources includes one or more of time resources, frequency resources, or preamble resources for use in transmitting the access request. In some examples, the indication of the assigned set of resources comprises an index into a plurality of available sets of preamble resources. In some examples, the plurality of available sets of resources may be pre-defined or semi-statically configured. The random access coordinator 830 may also receive an acknowledgment from the UE indicating correct reception of the small data packet (not shown). In some examples, the access request from the UE may include a random access preamble, and the random access coordinator 830 may initiate transmitting a random access response to the UE responsive to the random access preamble. The random access coordinator 830 may also receive a data request from the UE responsive to the random access response (not shown).

Figure 9:
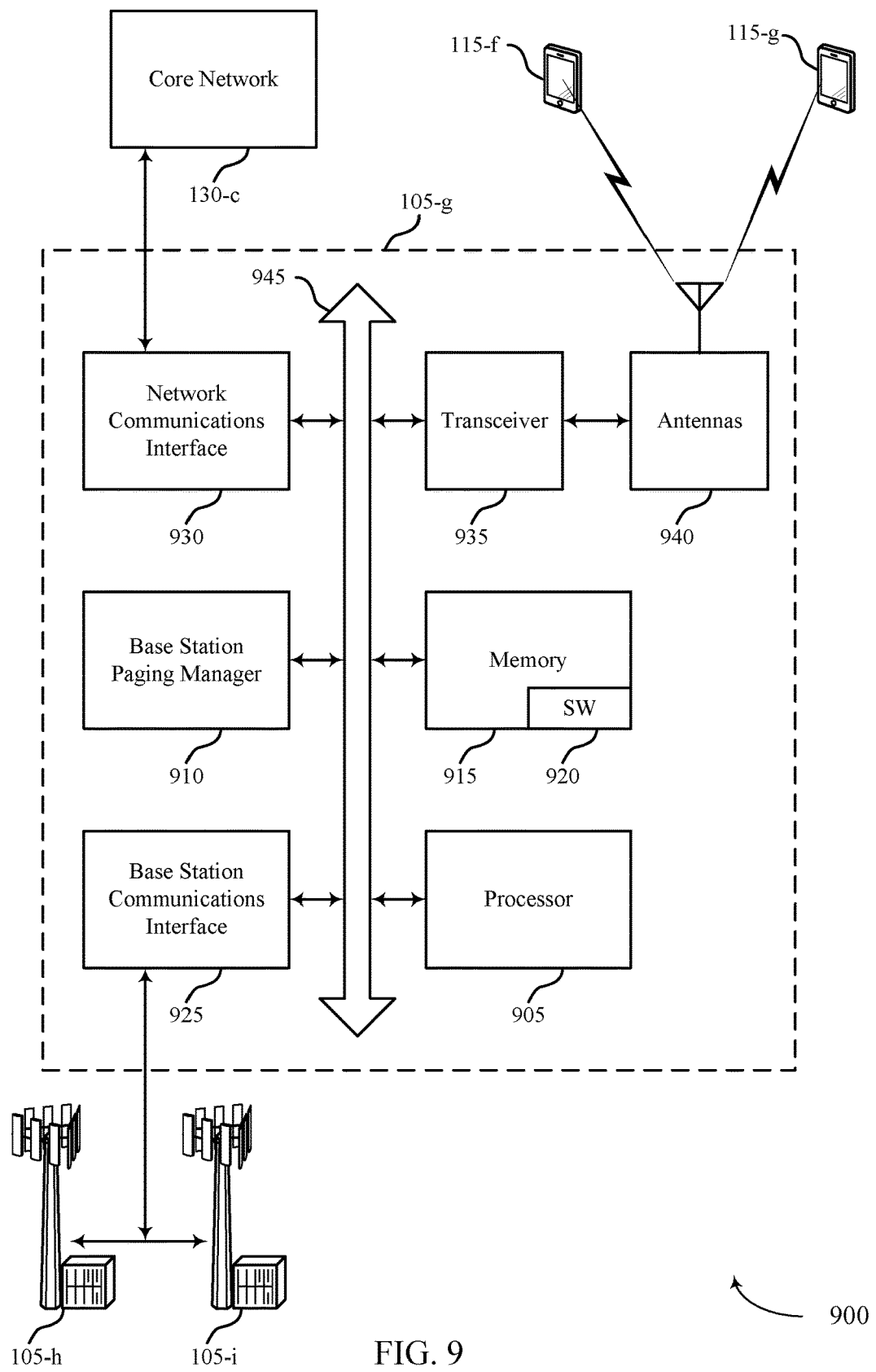
FIG. 9 illustrates a block diagram of a system including a base station that supports small data transmission in a wireless communication system in accordance with various aspects of the present disclosure.

FIG. 9 shows a diagram of a system 900 including a base station 105-g configured for small data transmission in a wireless communication system in accordance with various aspects of the present disclosure. System 900 may include base station 105-g, which may be an example of a wireless device 800 described with reference to FIGS. 1-6 and 8. Base station 105-g may include a base station paging manager 910, which may be an example of a base station paging manager 810 described with reference to FIG. 8. Base station 105-g may also include components for bi-directional voice and data communications including components for transmitting communications and components for receiving communications. For example, base station 105-*g* may communicate bi-directionally with UE 115-*f* or UE 115-*g*.

In some cases, base station 105-*g* may have one or more wired backhaul links. Base station 105-*g* may have a wired backhaul link (e.g., S1 interface, etc.) to the core network 130-*c*. Base station 105-*g* may also communicate with other base stations 105, such as base station 105-*h* and base station 105-*i* via inter-base station backhaul links (e.g., an X2 interface). Each of the base stations 105 may communicate with UEs 115 using the same or different wireless communications technologies. In some cases, base station 105-*g* may communicate with other base stations such as 105-*h* or 105-*i* utilizing base station communication module 925. In some examples, base station communication module 925 may provide an X2 interface within a LTE/LTE-A wireless communication network technology to provide communication between some of the base stations 105. In some examples, base station 105-*g* may communicate with other base stations through core network 130. In some cases, base station 105-*g* may communicate with the core network 130 through network communications interface 930.

The base station 105-*g* may include a processor 905, memory 915 (including software (SW) 1420), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-*g*) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-*g* may include multiple transceivers 935, each with one or more associated antennas 940. The transceiver may be an example of a combined receiver 805 and transmitter 815 of FIG. 8.

The memory 915 may include RAM and ROM. The memory 915 may also store computer-readable, computer-executable software code 920 containing instructions that are configured to, when executed, cause the processor 910 to perform various functions described herein (e.g., small data transmission in a wireless communication system, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications interface 925 may manage communications with other base stations 105. In some cases, a communications management module may include a controller or scheduler for controlling communications with UEs 115 in cooperation with other base stations 105. For example, the base station communications interface 925 may coordinate scheduling for transmissions to UEs 115 for various interference mitigation techniques such as beamforming or joint transmission.

The components of wireless device 800, and base station paging managers 810 and 910 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
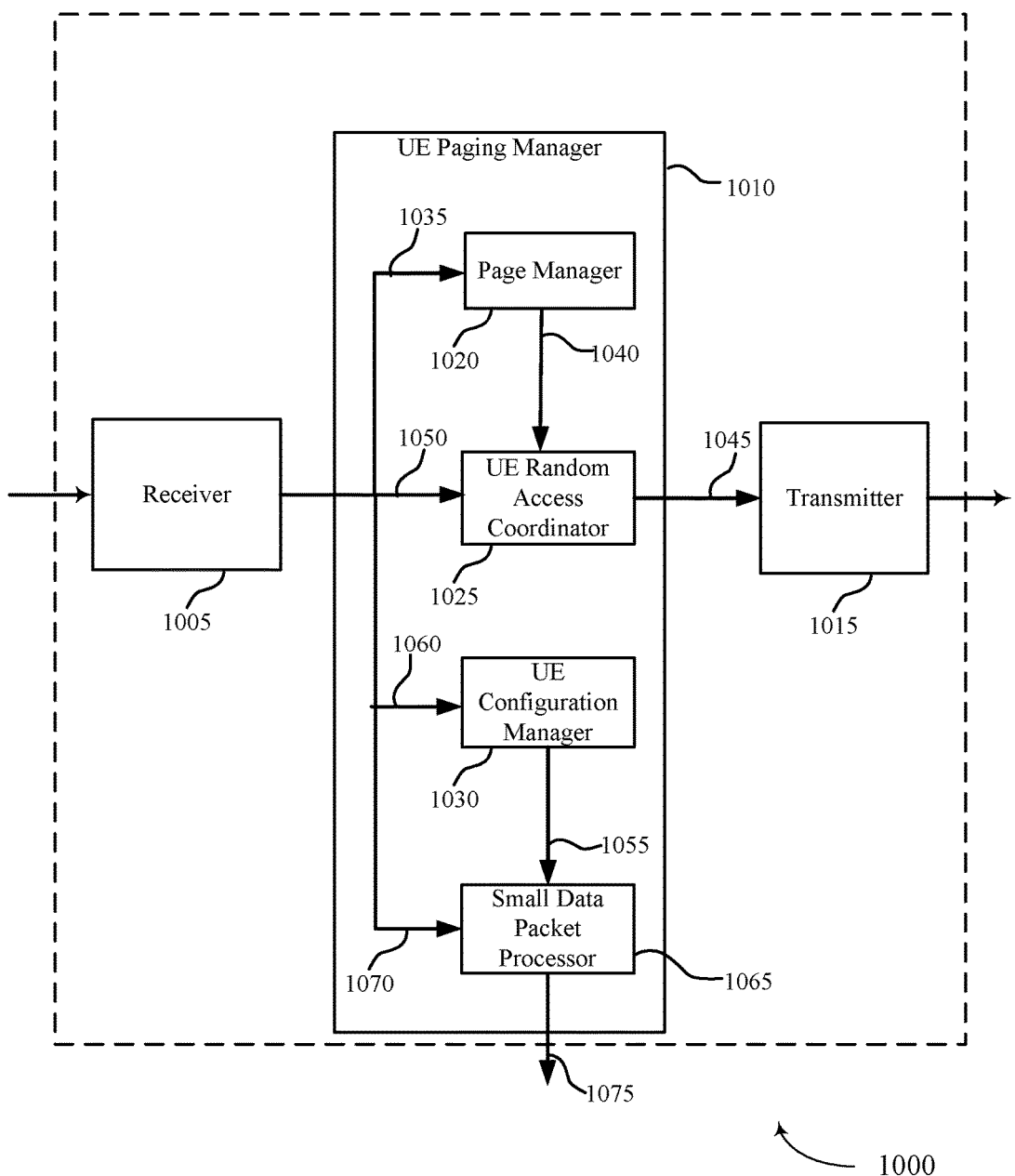
FIG. 10 shows a block diagram of a wireless device, such as a UE, that supports small data transmission in a wireless communication system in accordance with various aspects of the present disclosure.

FIG. 10 shows a block diagram of a wireless device 1000 configured for small data transmission in a wireless communication system in accordance with various aspects of the present disclosure. Wireless device 1000 may be an example of aspects of a UE 115 described with reference to FIGS. 1-9. Wireless device 1000 may include a receiver 1005, a UE paging manager 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to small data transmission in a wireless communication system, etc.). Information may be passed on to the UE paging manager 1010, and to other components of wireless device 1000.

The UE paging manager 1010 may receive a page from a base station including at least one of: an indication that a small data packet is to be transmitted to the UE, or the small data packet. The UE may initiate a random access channel (RACH) procedure by transmitting an access request to the base station responsive to the page, and may acknowledge the small data packet responsive to the access request during the RACH procedure. The acknowledgement may be transmitted, for example, via uplink resources of an uplink control channel (e.g., PUCCH) or uplink data channel (e.g., PUSCH) provided in the random access response or based on resources associated with the random access response (e.g., RA-RNTI, PDSCH location of random access response, etc.).

The UE paging manager 1010 may include a page manager 1020, a UE random access coordinator 1025, a UE configuration manager 1030, and a small data packet processor 1065. The page manager 1020 may receive the page 1035 and, based on the indication that a small data packet is to be transmitted to the UE, may initiate a RACH procedure by transmitting an access request 1040 responsive to the page via UE random access coordinator 1025. UE random access coordinator 1025 may forward the access request 1040 to the base station in communication 1045 via transmitter 1015.

UE random access coordinator 1025 may also receive a random access response in communication 1050 responsive to access request 1040 which may or may not contain the small data packet. In some examples, besides the small data packet, the random access response may also contain an uplink grant, which may be used to send data originated at the UE 115 or to send an acknowledgment to indicate correct reception of data. In certain examples, the random access response also may include an indication for the UE 115 to continue with the RRC connection, in cases where the base station 105 may determine to proceed with establishing the RRC connection with the UE 115. The random access coordinator 1025 may then transmit in communication 1045 a connection setup message (e.g., in the resources granted in the uplink grant) via transmitter 1015.

In some examples the page message 1035 may optionally include a dedicated random access preamble assignment (which may be used to indicate a small data transmission). The UE 115 may then perform an RRC connection establishment procedure with the base station 105 using techniques described in FIG. 6. This RRC connection establishment procedure may include a connection setup message in communication 1050 which may include the small data packet as a payload. In some examples, the small data packet may instead be sent in messaging from the base station 105 after a connection setup complete message but prior to an attach procedure used to establish the security context and dedicated radio bearers. Thus, the small data packet may be sent in a control plane message associated with a signaling radio bearer prior to establishment of any dedicated radio bearers, including the default radio bearer.

The UE configuration manager 1030 may include configuration information 1055 for small data transmissions, such as NAS security information, for example. The UE configuration manager 1030 may also receive configuration information 1060 from a C-SGN related to connectionless small data transmissions. The UE configuration manager 1030 may provide the configuration information 1055 to small data packet processor 1065, which may process (e.g., decrypt, integrity protect, etc.) small data packets 1070 to provide processed small data packets 1075 to higher layers (e.g., applications, etc.).

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
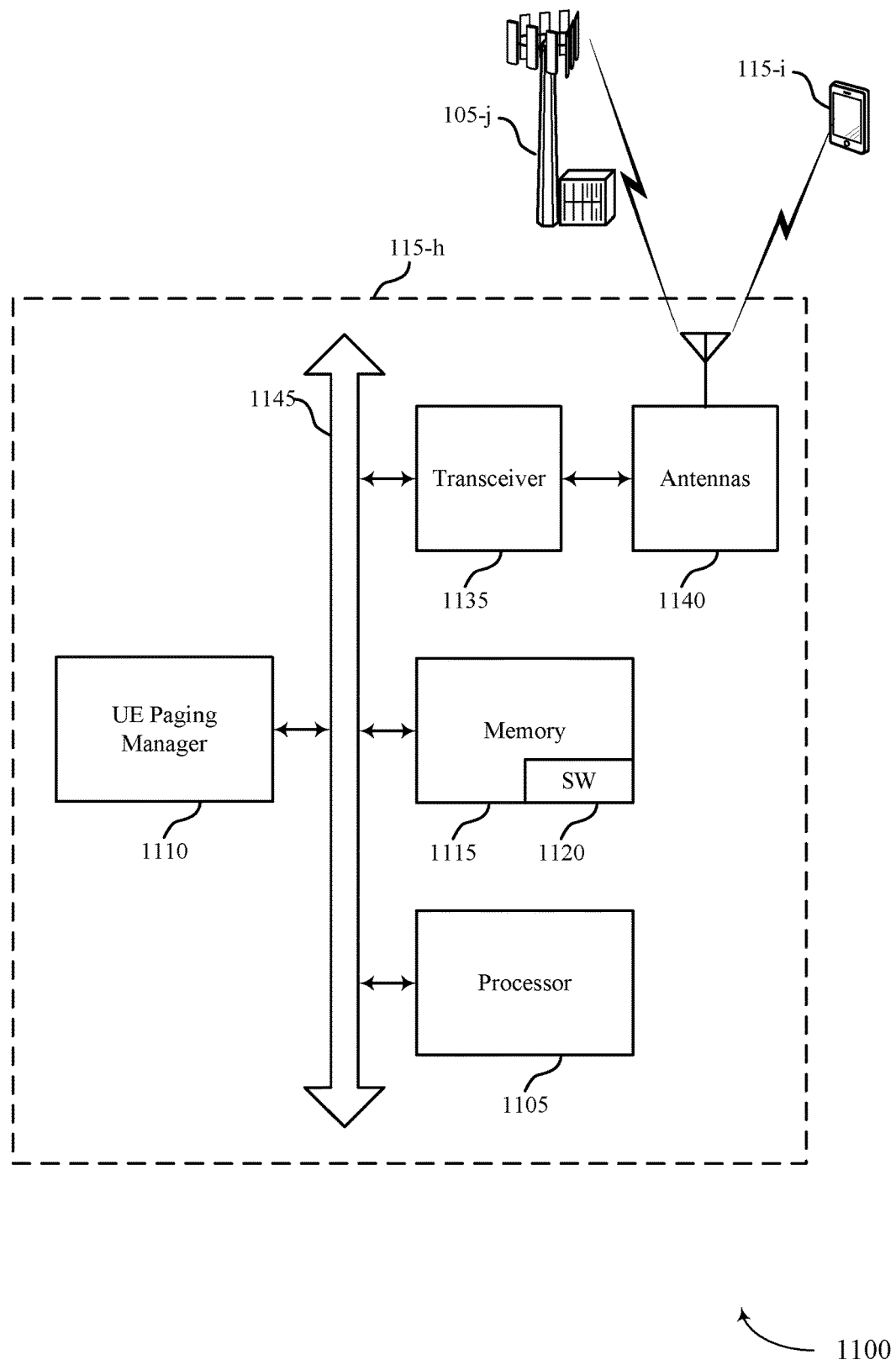
FIG. 11 illustrates a block diagram of a system including a UE that supports small data transmission in a wireless communication system in accordance with various aspects of the present disclosure.

FIG. 11 shows a diagram of a system 1100 including a UE 115 configured for small data transmission in a wireless communication system in accordance with various aspects of the present disclosure. System 1100 may include UE 115-h, which may be an example of a wireless device 1000, or a UE 115 described with reference to FIGS. 1-6 and 8-10. UE 115-h may include a UE paging manager 1110, which may be an example of a UE paging manager 1010 described with reference to FIG. 10. UE 115-h may also include components for bi-directional voice and data communications including components for transmitting communications and components for receiving communications. For example, UE 115-h may communicate bi-directionally with base station 105-j or UE 115-i.

UE 115-h may also include a processor 1105, and memory 1115 (including software (SW)) 1120, a transceiver 1135, and one or more antenna(s) 1140, each of which may communicate, directly or indirectly, with one another (e.g., via buses 1145). The transceiver 1135 may communicate bi-directionally, via the antenna(s) 1140 or wired or wireless links, with one or more networks, as described above. For example, the transceiver 1135 may communicate bi-directionally with a base station 105 or another UE 115. The transceiver 1135 may include a modem to modulate the packets and provide the modulated packets to the antenna(s) 1140 for transmission, and to demodulate packets received from the antenna(s) 1140. While UE 115-h may include a single antenna 1140, UE 115-h may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., small data transmission in a wireless communication system, etc.). Alternatively, the software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an ASIC, etc.)

Figure 12:
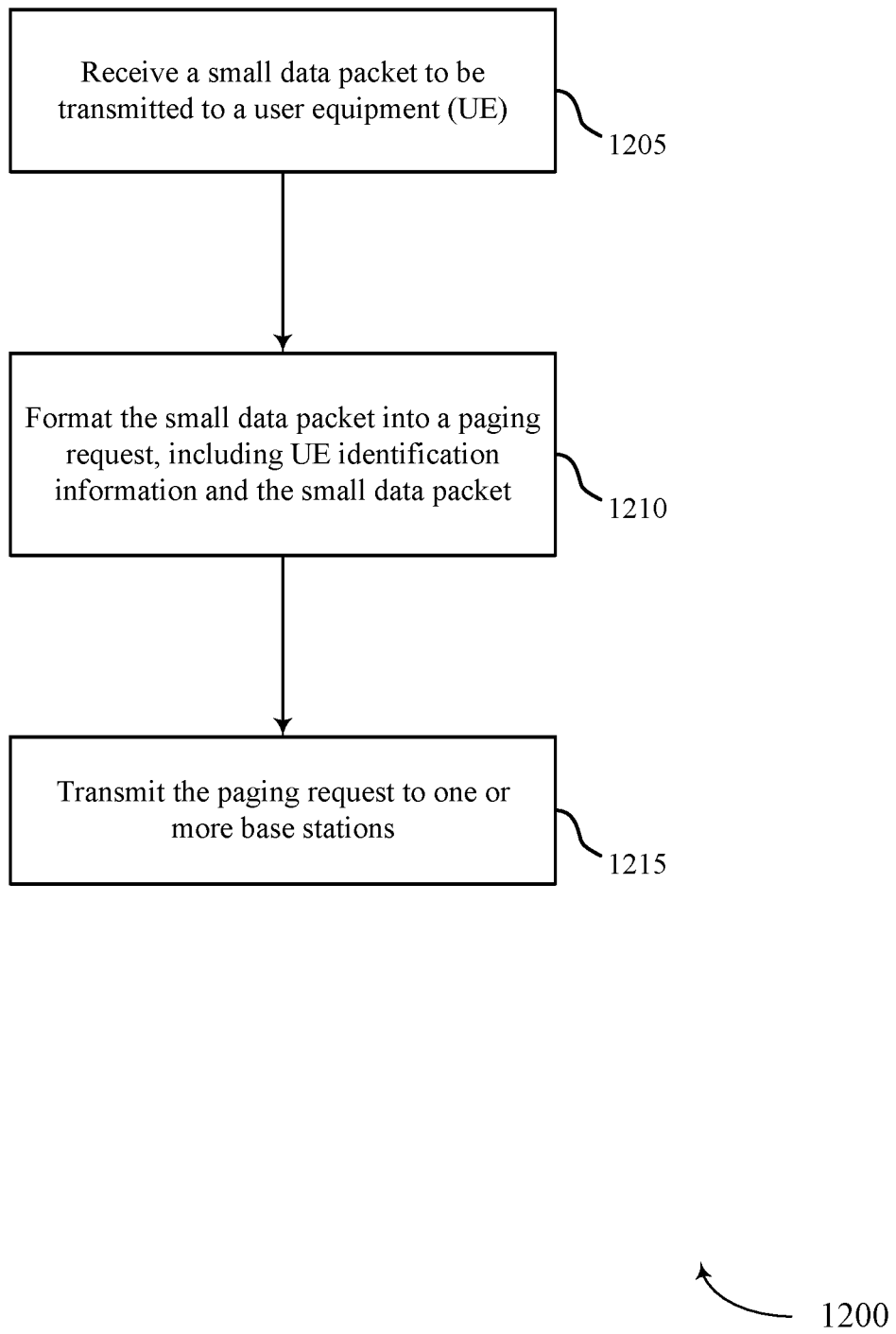
FIGS. 12-14 illustrate methods for small data transmission in a wireless communication system in accordance with various aspects of the present disclosure.

FIG. 12 shows a flowchart illustrating a method 1200 for small data transmission in a wireless communication system in accordance with various aspects of the present disclosure. The operations of method 1200 may be implemented by a core network component, such as C-SGN 310 or its components as described with reference to FIGS. 1-11. For example, the operations of method 1200 may be performed by the core network paging manager 705 as described with reference to FIG. 7. In some examples, a core network component may execute a set of codes to control the functional elements of the component to perform the functions described below. Additionally or alternatively, the core network component may perform aspects the functions described below using special-purpose hardware.

At block 1205, the core network component may receive a small data packet to be transmitted to a UE as described with reference to FIGS. 2-6. In certain examples, the operations of block 1205 may be performed by the GW interface 710 as described with reference to FIG. 7.

At block 1210, the core network component may format the small data packet into a paging request, the paging request including UE identification information and the small data packet as described with reference to FIGS. 2-6. In certain examples, the operations of block 1210 may be performed by the paging request formatter 715 as described with reference to FIG. 7.

At block 1215, the core network component may transmit the paging request to one or more base stations as described with reference to FIGS. 2-6. In certain examples, the operations of block 1215 may be performed by the RAN interface 720 as described with reference to FIG. 7.

Figure 13:
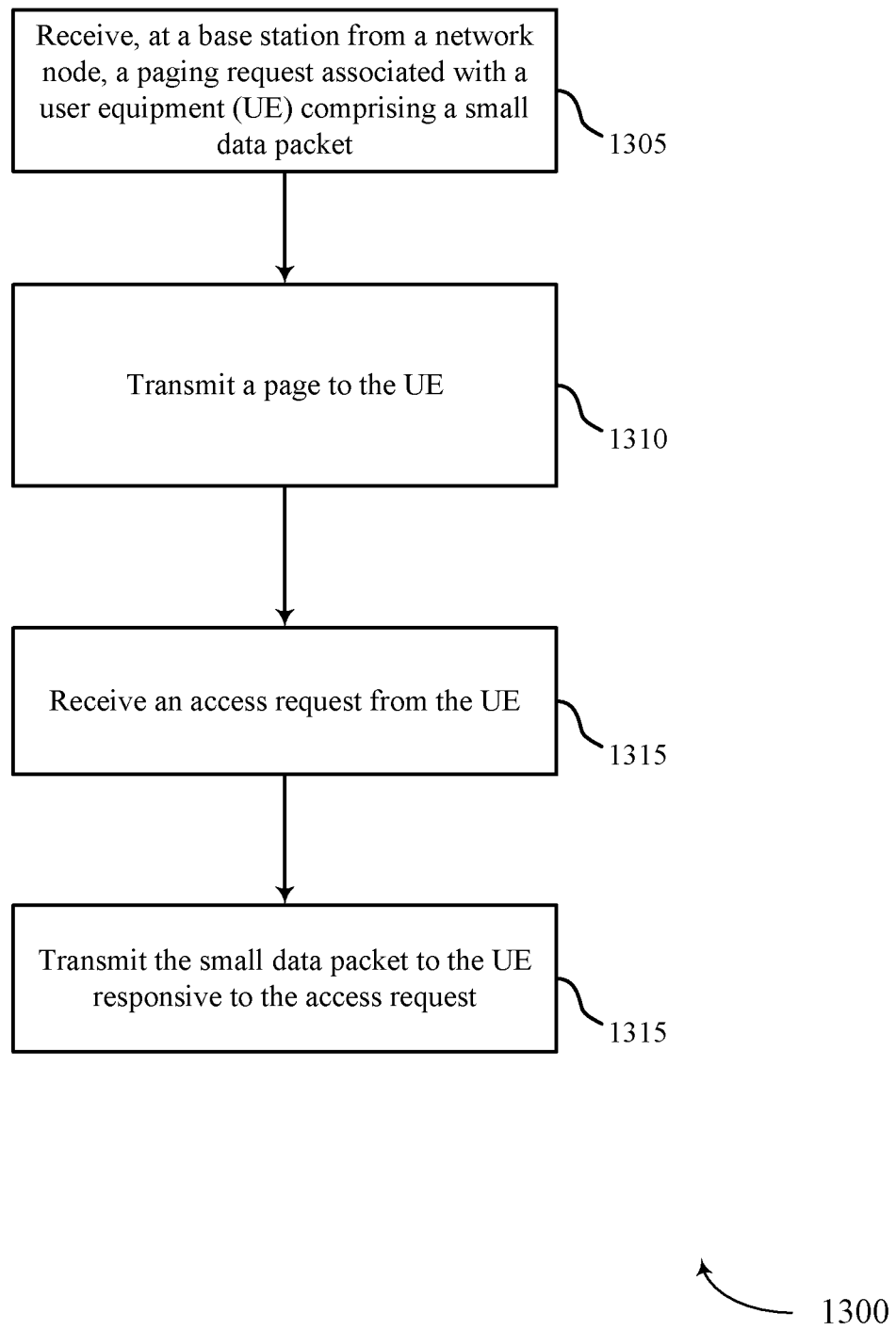

FIG. 13 shows a flowchart illustrating a method 1300 for small data transmission in a wireless communication system in accordance with various aspects of the present disclosure. The operations of method 1300 may be implemented by a base station 105 or its components as described with reference to FIGS. 1-11. For example, the operations of method 1300 may be performed by the base station paging manager 810 or base station paging manager 910 as described with reference to FIGS. 8-9. In some examples, a base station 105 may execute a set of codes to control the functional elements of the base station 105 to perform the functions described below. Additionally or alternatively, the base station 105 may perform aspects the functions described below using special-purpose hardware.

At block 1305, the base station 105 may receive a paging request from a network node, the paging request associated with a UE comprising a small data packet, as described with reference to FIGS. 2-6. In certain examples, the operations of block 1305 may be performed by the base station paging request manager 820 as described with reference to FIG. 8.

At block 1310, the base station 105 may transmit a page to the UE, as described with reference to FIGS. 2-6. In certain examples, the operations of block 1310 may be performed by the UE transmission interface 825 as described with reference to FIG. 8.

At block 1315, the base station 105 may receive an access request from the UE as described with reference to FIGS.

2-6. In certain examples, the operations of block 1315 may be performed by the random access coordinator 830 as described with reference to FIG. 8.

At block 1320, the base station 105 may transmit the small data packet to the UE responsive to the access request as described with reference to FIGS. 2-6. In certain examples, the operations of block 1320 may be performed by the random access coordinator 830 as described with reference to FIG. 8.

Figure 14:
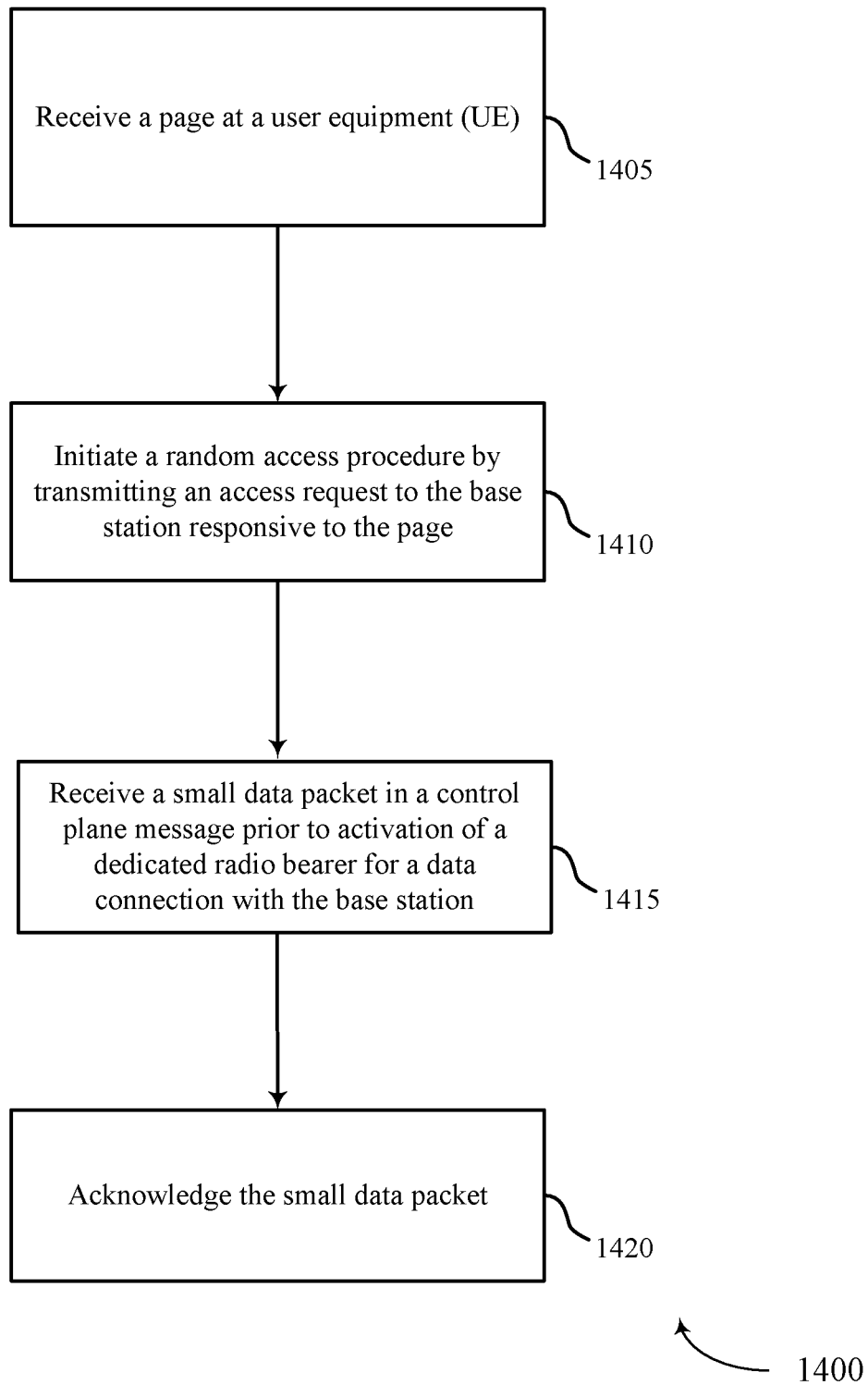

FIG. 14 shows a flowchart illustrating a method 1400 for small data transmission in a wireless communication system in accordance with various aspects of the present disclosure. The operations of method 1400 may be implemented by a UE 115 or its components as described with reference to FIGS. 1-11. For example, the operations of method 1400 may be performed by the UE paging manager 1010 or UE paging manager 1110 as described with reference to FIGS. 10-11. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive a page from a base station, as described with reference to FIGS. 2-6. In certain examples, the operations of block 1405 may be performed by the page manager 1020 as described with reference to FIG. 10.

At block 1410, the UE 115 may initiate a random access procedure by transmitting an access request to the base station responsive to the page, as described with reference to FIGS. 2-6. In certain examples, the operations of block 1410 may be performed by the UE random access coordinator 1025 as described with reference to FIG. 10.

At block 1415, the UE 115 may receive a small data packet in a control plane message prior to activation of a dedicated radio bearer for a data connection with the base station, as described with reference to FIGS. 2-6. In certain examples, the operations of block 1415 may be performed by the UE random access coordinator 1025 as described with reference to FIG. 10.

At block 1420, the UE 115 may acknowledge the small data packet responsive to the access request during the RACH procedure as described with reference to FIGS. 2-6. In certain examples, the operations of block 1420 may be performed by the UE random access coordinator 1025 as described with reference to FIG. 10.

Thus, methods 1200, 1300, and 1400 may provide for small data transmission in a wireless communication system. It should be noted that methods 1200, 1300, and 1400 describe possible implementation, and that the operations and the steps may be rearranged or otherwise modified such that other implementations are possible. In some examples, aspects from two or more of the methods 1200, 1300, and 1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and Long Term Evolution (LTE)-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, at a base station from a network node, a paging request associated with a user equipment (UE), wherein the paging request comprises a small data packet, wherein the small data packet comprises user Internet Protocol (IP) data transferred via a serving gateway;
   transmitting a page to the UE;
   receiving a random access preamble from the UE responsive to the page; and
   transmitting the small data packet in a random access response to the UE responsive to the random access preamble, wherein the random access response comprises a first field for a timing advance, a second field for an uplink grant, and/or a third field for a cell radio network temporary identifier (C-RNTI), and wherein the small data packet replaces the first field for the timing advance, the second field for uplink grant, and/or the third field for the C-RNTI in the random access response.

2. The method of claim 1, further comprising:
   receiving an acknowledgement from the UE indicating correct reception of the small data packet; and
   transmitting, to the network node, a confirmation that the small data packet was delivered to the UE.

3. The method of claim 1, wherein the random access preamble is received on a set of physical random access channel (PRACH) resources associated with connectionless transfer of small data packets.

4. The method of claim 2, further comprising:
   establishing a radio resource control (RRC) connection with the UE, wherein the random access response comprises an indication for the UE to continue with an RRC connection procedure.

5. The method of claim 4, further comprising:
   transmitting an indication signaling the UE to release an established RRC connection based at least in part on receiving the acknowledgement from the UE indicating correct reception of the small data packet.

6. A method for wireless communication, comprising:
   receiving, at a user equipment (UE), a page from a base station;
   initiating a random access procedure by transmitting a random access preamble to the base station responsive to the page;
   receiving a small data packet in a random access response from the base station, the random access response responsive to the random access preamble, wherein the small data packet comprises user Internet Protocol (IP) data transferred via a serving gateway, and wherein the random access response comprises a first field for a timing advance, a second field for an uplink grant, and/or a third field for a cell radio network temporary identifier (C-RNTI), and wherein the small data packet replaces the first field for the timing advance, the second field for uplink grant, and/or the third field for the C-RNTI in the random access response; and
   acknowledging the small data packet.

7. The method of claim 6, wherein the random access preamble is transmitted on a set of physical random access channel (PRACH) resources associated with connectionless transfer of small data packets.

8. The method of claim 6, wherein the received page comprises dedicated physical random access channel (PRACH) resource information.

9. The method of claim 6, wherein the random access response comprises an indication for the UE to continue with a radio resource control (RRC) connection procedure.

10. The method of claim 9, further comprising:
    receiving an indication signaling the UE to release an established RRC connection subsequent to acknowledging the small data packet.

11. An apparatus for communication, comprising:
    a processor;
    memory in electronic communication with the processor; and
    instructions stored in the memory;
    wherein the instructions are executable by the processor to:
    receive, at a base station from a network node, a paging request associated with a user equipment (UE), wherein the paging request comprises a small data packet, wherein the small data packet comprises user Internet Protocol (IP) data transferred via a serving gateway;
    transmit a page to the UE;
    receive a random access preamble from the UE responsive to the page; and
    transmitting the small data packet in a random access response to the UE responsive to the random access preamble, wherein the random access response comprises a first field for a timing advance, a second field for an uplink grant, and/or a third field for a cell radio network temporary identifier (C-RNTI), and wherein the small data packet replaces the first field for the timing advance, the second field for uplink grant, and/or the third field for the C-RNTI in the random access response.

12. The apparatus of claim 11, wherein the instructions are further operable to cause the apparatus to:
    receive an acknowledgement from the UE indicating correct reception of the small data packet; and
    transmit, to the network node, a confirmation that the small data packet was delivered to the UE.

13. The apparatus of claim 11, wherein the random access preamble is received on a set of physical random access channel (PRACH) resources associated with connectionless transfer of small data packets.

14. The apparatus of claim 12, wherein the instructions are further operable to cause the apparatus to:
    establish a radio resource control (RRC) connection with the UE, wherein the random access response comprises an indication for the UE to continue with an RRC connection procedure.

15. The apparatus of claim 14, wherein the instructions are further operable to cause the apparatus to:
    transmit an indication signaling the UE to release an established RRC connection based at least in part on receiving the acknowledgement from the UE indicating correct reception of the small data packet.

16. An apparatus for communication, comprising:
a processor;
memory in electronic communication with the processor; and
instructions stored in the memory;
wherein the instructions are executable by the processor to:
receive, at a user equipment (UE), a page from a base station;
initiate a random access procedure by transmitting a random access preamble to the base station responsive to the page;
receiving a small data packet in a random access response from the base station, the random access response responsive to the random access preamble, wherein the small data packet comprises user Internet Protocol (IP) data transferred via a serving gateway, and wherein the random access response comprises a first field for a timing advance, a second field for an uplink grant, and/or a third field for a cell radio network temporary identifier (C-RNTI), and wherein the small data packet replaces the first field for the timing advance, the second field for uplink grant, and/or the third field for the C-RNTI in the random access response; and
acknowledging the small data packet.

17. The apparatus of claim 16, wherein the random access preamble is transmitted on a set of physical random access channel (PRACH) resources associated with connectionless transfer of small data packets.

18. The apparatus of claim 16, wherein the received page comprises dedicated physical random access channel (PRACH) resource information.

19. The apparatus of claim 16, wherein the random access response comprises an indication for the UE to continue with a radio resource control (RRC) connection procedure.

20. The apparatus of claim 19, wherein the instructions are further operable to cause the apparatus to:
receive an indication signaling the UE to release an established RRC connection subsequent to acknowledging the small data packet.

* * * * *